US010869062B2

(12) United States Patent
Egilmez et al.

(10) Patent No.: US 10,869,062 B2
(45) Date of Patent: Dec. 15, 2020

(54) PROBABILITY INITIALIZATION AND SIGNALING FOR ADAPTIVE ARITHMETIC CODING IN VIDEO CODING

(71) Applicant: QUALCOMM Incorporated, San Diego, CA (US)

(72) Inventors: Hilmi Enes Egilmez, San Diego, CA (US); Li Zhang, San Diego, CA (US); Vadim Seregin, San Diego, CA (US); Amir Said, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/211,694

(22) Filed: Dec. 6, 2018

(65) Prior Publication Data
US 2019/0200043 A1 Jun. 27, 2019

Related U.S. Application Data

(60) Provisional application No. 62/609,211, filed on Dec. 21, 2017.

(51) Int. Cl.
*H04N 19/70* (2014.01)
*H04N 19/13* (2014.01)
(Continued)

(52) U.S. Cl.
CPC ............ *H04N 19/70* (2014.11); *H04N 19/13* (2014.11); *H04N 19/157* (2014.11);
(Continued)

(58) Field of Classification Search
CPC ...... H04N 19/70; H04N 19/13; H04N 19/157; H04N 19/197
See application file for complete search history.

(56) References Cited

U.S. PATENT DOCUMENTS

2013/0028334 A1* 1/2013 Bossen ............... H03M 7/4018
375/240.25
2013/0114691 A1* 5/2013 Guo .................... H03M 7/4018
375/240.03
(Continued)

OTHER PUBLICATIONS

Albrecht M., et al., "Description of SDR, HDR and 360° video coding technology proposal by Fraunhofer HHI", 10.JVET Meeting; Oct. 4, 2018-Apr. 20, 2018; San Diego; (The Joint Video Exploration Team of ISO/IEC JTC1/SC29/WG11 and ITU-T SG. 16 ), 118 pages, URL: http://phenix.int-evry.fr/jvet/, No. JVET-J0014, Apr. 3, 2018 (Apr. 3, 2018), XP030151172.
(Continued)

*Primary Examiner* — Jamie J Atala
*Assistant Examiner* — Michael Robert Cammarata
(74) *Attorney, Agent, or Firm* — Shumaker & Sieffert, P.A.

(57) ABSTRACT

A method of decoding video data includes receiving, by processing circuitry, a video bitstream including encoded representations of one or more syntax elements of a coded unit and initializing, by the processing circuitry, a respective probability state for each bin of a plurality of bins for the one or more syntax elements based on a comparison of a parameter associated with the coded unit and a respective threshold of a plurality of thresholds. The method further includes performing, by the processing circuitry, inverse binary arithmetic coding on the encoded representations of the one or more syntax elements to obtain each bin of the plurality of bins using a respective probability state for the bin, inverse binarizing, by the processing circuitry, the plurality of bins to obtain the one or more syntax elements, and decoding, by the processing circuitry, the video data based on the one or more syntax elements.

40 Claims, 16 Drawing Sheets

(51) Int. Cl.
  H04N 19/157  (2014.01)
  H04N 19/172  (2014.01)
  H04N 19/44   (2014.01)
  H04N 19/91   (2014.01)
  H04N 19/196  (2014.01)
(52) U.S. Cl.
  CPC ......... H04N 19/172 (2014.11); H04N 19/197 (2014.11); H04N 19/44 (2014.11); H04N 19/91 (2014.11)

(56) References Cited

U.S. PATENT DOCUMENTS

| | | | |
|---|---|---|---|
| 2015/0195562 A1* | 7/2015 | Li | H04N 19/51 375/240.02 |
| 2016/0100171 A1* | 4/2016 | Karczewicz | H04N 19/70 375/240.02 |
| 2016/0353111 A1 | 12/2016 | Zhang et al. | |
| 2016/0353112 A1 | 12/2016 | Zhang et al. | |
| 2016/0353113 A1* | 12/2016 | Zhang | H04N 19/13 |
| 2019/0281301 A1* | 9/2019 | Misra | H04N 19/13 |
| 2020/0029091 A1* | 1/2020 | Chien | H04N 19/91 |

OTHER PUBLICATIONS

Alshin A., et al., "CE1 (subset B): Multi-parameter probability up-date for CABAC", Nov. 21-30, 2011; (Joint Collaborative Team on Video Coding (JCT-VC) of ITU-T SG16 WP3 and ISO/IEC JTC1/SC29/WG11), doc. No. JCTVC-G764, 7th Meeting: Geneva, Nov. 18, 2011; 4 pages.

Alshin A., et al., "Multi-Parameter Probability Up-Date for CABAC", 6, JCT-VC Meeting, 97, MPEG Meeting, Jul. 14, 2011-Jul. 22, 2011, Torino, (Joint Collaborative Team on Video Coding of ISO/IEC JTC1/SC29/WG11 and ITU-T SG.16); URL: http://wftp3.1tu.int/av-arch/jctvc-site/, No. JCTVC-F254, Jul. 2, 2011 (Jul. 2, 2011), pp. 1-5, XP030009277.

Bross B., et al., "High Efficiency Video Coding (HEVC) Text Specification Draft 10 (for FDIS & Last Call)," 12th Meeting: Geneva, CH, Jan. 14-23, 2013, (Joint Collaborative Team on Video Coding of ISO/IEC JTC 1/SC 29/WG 11 and ITU-T SG 16 WP 3); JCTVC-L1003_v34, Mar. 19, 2013, 310 pages.

Chen, et al., "Further improvements to HMKTA-1.0," ITU—Telecommunications Standardization Sector, Jun. 19-26, 2015, No. VCEG-AZ07_v2, 9 pp.

Chen J., et al., "Algorithm description for Versatile Video Coding and Test Model 1 (VTM 1)", Joint Video Experts Team (JVET) of ITU-T SG 16 WP 3 and ISO/IEC JTC 1/SC 29/WG 11, 10th Meeting: San Diego, US, Apr. 10-20, 2018, JVET-J1002-v2, 10 pages.

Chen J., et al "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.

Chen J., et al "Further Improvements to HMKTA-1.1", 52. VCEG Meeting, Jun. 19, 2015-Jun. 26, 2015, Warsaw, (Video Coding Experts Group of ITU-T SG.16), No. VCEG-AZ07_V3, Jun. 25, 2015 (Jun. 25, 2015), XP030003886.

Chen Y W., et al., "Description of SDR, HDR and 360° Video Coding Technology Proposal by Qualcomm and Technicolor""low and High Complexity Versions", 10. JVET Meeting, Oct. 4, 2018-Apr. 20, 2018, San Diego, (The Joint Video Exploration Team of ISO/IEC JTC1/SC29/WG11 and ITU-T SG.16 ), URL:http://phenix.int-evry.fr/jvet/,,No. JVET-J0021, Apr. 3, 2018 (Apr. 3, 2018), XP030151183, pp. 1-43.

Choi K., et al., "CE5: Counter-based Probability estimation (Test 2.4)", NPJoint Video Experts Team (JVET) of ITU-T SG 16 WP 3 and ISO/IEC JTC 1/SC 29/WG 11, JVET -K0170-v1, Jul. 18, 2018, 4 pages.

High-Level Syntax, Signals and Communication Technology, High Efficiency Video Coding, Chapter 5, Sep. 30, 2014, pp. 133-160.

International Search Report and Written Opinion—PCT/US2018/064469—ISA/EPO—dated Feb. 15, 2019.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

ITU-T H.263, Series H: Audiovisual and Multimedia Systems, Infrastructure of audiovisual services—Coding of moving video, Video coding for low bit rate communication, The International Telecommunication Union. Jan. 2005, 226 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

"ITU-T H.265, Series H: Audiovisual and Multimedia Systems, Infrastructure of audiovisual services—Coding of moving video, High efficiency video coding," The International Telecommunication Union, Apr. 2015, 634 pp.

ITU-T Rec. H.261 (Dec. 1990), "Line Transmission on Non-Telephone Signals, Video Codec for Audiovisual Services AT p x 64 kbit/s", 32 Pages.

Marpe D., et al., "Context-Based Adaptive Binary Arithmetic Coding in the H.264/AVC Video Compression Standard", IEEE Transactions on Circuits and Systems for Video Technology, vol. 13, No. 7, Jul. 1, 2003, pp. 620-636, XP055120073, ISSN: 1051-8215, DOI: 10.1109/TCSVT.2003.815173.

Marpe D., et al., "Transform Coding Using the Residual Quadtree (RQT)", Fraunhofer Heinrich Hertz Institute, 4pp. URL: http://www.hhi.fraunhofer.de/fields-of-competence/image-processing/researchgroups/ image-video-coding/hevc-high-efficiency-video-coding/transform-coding-using-the-residual-quadtree-rqt.html ; [ Retrieved on Feb. 9, 2017].

Mukherjee D., et al., "The latest open-source video codec VP9—An overview and preliminary results," IEEE 2013, Feb. 2013, pp. 390-393.

Nguyen, et al., "Non-CE11: Proposed Cleanup for Transform Coefficient Coding," Document JCTVC-H0228, Joint Collaborative Team on Video Coding (JCT-VC) of ITU-T SG16 WP3 and ISO/IEC JTC1/SC29/WG11, 8th Meeting: San José, CA, USA, XP030111255, Feb. 1-10, 2012, pp. 1-9.

Richardson I.E.G., "H.264 and MPEG-4 Video Compression", John Wiley & Sons Ltd., 2003.

Said A., "Arithmetic Coding," Lossless Compression Handbook, K. Sayood, Ed., Academic Press, Chapter 5, 2003, pp. 101-152.

Said A., et al., "Arithmetic Coding with Context-Dependent Double-Window Adaptation Response", 7. JVET Meeting, Jul. 13, 2017-Jul. 21, 2017, Torino, (The Joint Video Exploration Team of ISO/IEC JTC1/SC29/WG11 and ITU-T SG.16); URL: http://phenix.int-evry.fr/jvet/, No. JVET-G0112-v2, Jul. 14, 2017 (Jul. 14, 2017), XP030150916, pp. 1-4.

Said A., et al., "CE5: CABAC Probability Initialization from previous Inter Frames (test C1)", Joint Video Experts Team (JVET) of ITU-T SG 16 WP 3 and ISO/IEC JTC 1/SC 29/WG 11, JVET-K0379-v1, Jul. 10-18, 2018, 4 pages.

Said A., et al., "CE5: Combined Arithmetic Coding Tools (Test CE 5.1)", Joint Video Experts Team (JVET) of ITU-T SG 16 WP 3 and ISO/IEC JTC 1/SC 29/WG 11, JVET-K0381-v1, Jul. 10-18, 2018, 5 pages.

Said A., et al., "EE2 related: Arithmetic Coding with Progressive Context-Dependent Double-Window Adaptation Response", 8. JVET Meeting; Oct. 18, 2017-Oct. 25, 2017; MACAU; (The Joint Video Exploration Team of 180/IEC JTC1/SC29/ WG11 and ITU-T SG.16); URL: http://phenix.int-evry.fr/ jvet/, No. JVET-H0067-v2, Oct. 19, 2017 (Oct. 19, 2017), XP030151064, pp. 1-9.

Said, "Introduction to Arithmetic Coding—Theory and Practice," Hewlett Packard Laboratories, Technical Report HPL-2004-76, Apr. 2004, 67 pp.

Stegemann J., et al., CE5: Counter-based Probability Estimation and Changes to the Arithmetic Coding Engine (CE5.2, CE5.A2, CE5.B2

(56) References Cited

OTHER PUBLICATIONS and CE5.C2), Joint Video Experts Team (JVET) of ITU-T SG 16 WP 3 and ISO/IEC JTC 1/SC 29/WG 11, JVET-K0283-v3, Jul. 10-18, 2018, 26 pages.
Sze V., et al., "High Efficiency Video Coding (HEVC) : Algorithms and Architectures—Chapter 8: Entropy Coding in HEVC," In: "High Efficiency Video Coding (HEVC) : Algorithms and Architectures—Chapter 8: Entropy Coding in HEVC," Jan. 1, 2014 (Jan. 1, 2014), Springer International Publishing, XP55263413, ISBN: 978-3-319-06894-7 pp. 209-269.
Sze V., et al., "High Throughput CABAC Entropy Coding in HEVC", IEEE Transactions on Circuits and Systems for Video Technology, IEEE Service Center, Piscataway, NJ, US, vol. 22, No. 12, Dec. 1, 2012 (Dec. 1, 2012), pp. 1778-1791, XP011487151, ISSN: 1051-8215, DOI: 10.1109/TCSVT.2012.2221526.
TU-T Rec. H.262, Transmission of Non-Telephone Signals: Information Technology—Generic Coding of Moving Pictures and Associated Audio Information: Video, The International Telecommunication Union, Jul. 10, 1995, 211 pp.
Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.
Witten I.A., et al., "Arithmetic Coding for Data Compression", Communications of the ACM, vol. 30, No. 6, pp. 520-540 (1987).

\* cited by examiner

PROBABILITY INITIALIZATION AND SIGNALING FOR ADAPTIVE ARITHMETIC CODING IN VIDEO CODING

This application claims the benefit of U.S. Provisional Patent Application 62/609,211, filed on Dec. 21, 2017, the entire content of which is hereby incorporated by reference.

TECHNICAL FIELD

This disclosure relates to video coding and, more particularly, to techniques for binary arithmetic coding of video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, the H.266/Versatile Video Coding (VVC) standard, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

Various entropy coding processes may be used to code residual transform coefficients, motion vector information, syntax elements, and other associated information. Examples of various entropy coding and other data compression processes include context-adaptive variable length coding (CAVLC), context-adaptive binary arithmetic coding (CABAC), probability interval partitioning entropy coding (PIPE), Golomb coding, Golomb-Rice coding, and exponential Golomb coding.

SUMMARY

In general, this disclosure describes techniques for binary arithmetic coding in video coding, and video encoders and decoders for performing such techniques. In some examples, the techniques of this disclosure may perform a signaling scheme that allows an encoder and/or decoder to choose a set of probability initializations among multiple candidates. In some examples, the techniques of this disclosure may include per-context probability initialization. In some examples, the techniques of this disclosure may provide more flexible probability state initialization.

In one example, a method of decoding video data includes: receiving, by processing circuitry, a video bitstream including encoded representations of one or more syntax elements of a coded unit; initializing, by the processing circuitry, a respective probability state for each bin of a plurality of bins for the one or more syntax elements based on a comparison of a parameter associated with the coded unit and a respective threshold of a plurality of thresholds; performing, by the processing circuitry, inverse binary arithmetic coding on the encoded representations of the one or more syntax elements to obtain each bin of the plurality of bins using a respective probability state for the bin; inverse binarizing, by the processing circuitry, the plurality of bins to obtain the one or more syntax elements; and decoding, by the processing circuitry, the video data based on the one or more syntax elements.

In another example, a device for decoding video data includes one or more storage media; and one or more processors. The one or more processors are configured to: receive a video bitstream including encoded representations of one or more syntax elements of a coded unit; initialize a respective probability state for each bin of a plurality of bins for the one or more syntax elements based on a comparison of a parameter associated with the coded unit and a respective threshold of a plurality of thresholds; perform inverse binary arithmetic coding on the encoded representations of the one or more syntax elements to obtain each bin of the plurality of bins using a respective probability state for the bin; inverse binarize the plurality of bins to obtain the one or more syntax elements; and decode the video data based on the one or more syntax elements.

In another example, a computer-readable storage medium storing instructions that, when executed, cause one or more processors to: receive a video bitstream including encoded representations of one or more syntax elements of a coded unit; initialize a respective probability state for each bin of a plurality of bins for the one or more syntax elements based on a comparison of a parameter associated with the coded unit and a respective threshold of a plurality of thresholds; perform inverse binary arithmetic coding on the encoded representations of the one or more syntax elements to obtain each bin of the plurality of bins using a respective probability state for the bin; inverse binarize the plurality of bins to obtain the one or more syntax elements; and decode the video data based on the one or more syntax elements.

In another example, a device for decoding video data includes: means receiving a video bitstream including encoded representations of one or more syntax elements of a coded unit; means for initializing a respective probability state for each bin of a plurality of bins for the one or more syntax elements based on a comparison of a parameter associated with the coded unit and a respective threshold of a plurality of thresholds; means for performing inverse binary arithmetic coding on the encoded representations of the one or more syntax elements to obtain each bin of the plurality of bins using a respective probability state for the bin; means for inverse binarizing the plurality of bins to obtain the one or more syntax elements; and means for decoding the video data based on the one or more syntax elements.

In another example, a method of encoding video data includes: encoding, by processing circuitry, the video data to generate one or more syntax elements of a coded unit; binarizing, by the processing circuitry, the one or more syntax elements to obtain a plurality of bins; initializing, by the processing circuitry, a respective probability state for each bin of the plurality of bins for the one or more syntax elements based on a comparison of a parameter associated with the coded unit and a respective threshold of a plurality of thresholds; performing, by the processing circuitry, binary arithmetic coding on the plurality of bins of the one or more syntax elements to obtain encoded representations of the one or more syntax elements using a respective probability state for the bin; and outputting, by the processing circuitry, a video bitstream including the encoded representations of the one or more syntax elements.

In another example, a device for encoding video data includes one or more storage media; and one or more processors. The one or more processors are configured to: encode the video data to generate one or more syntax elements of a coded unit; binarize the one or more syntax elements to obtain a plurality of bins; initialize a respective probability state for each bin of the plurality of bins for the one or more syntax elements based on a comparison of a parameter associated with the coded unit and a respective threshold of a plurality of thresholds; perform binary arithmetic coding on the plurality of bins of the one or more syntax elements to obtain encoded representations of the one or more syntax elements using a respective probability state for the bin; and output a video bitstream including the encoded representations of the one or more syntax elements.

In another example, a computer-readable storage medium storing instructions that, when executed, cause one or more processors to: encode the video data to generate one or more syntax elements of a coded unit; binarize the one or more syntax elements to obtain a plurality of bins; initialize a respective probability state for each bin of the plurality of bins for the one or more syntax elements based on a comparison of a parameter associated with the coded unit and a respective threshold of a plurality of thresholds; perform binary arithmetic coding on the plurality of bins of the one or more syntax elements to obtain encoded representations of the one or more syntax elements using a respective probability state for the bin; and output a video bitstream including the encoded representations of the one or more syntax elements.

In another example, a device for encoding video data includes: means for encoding the video data to generate one or more syntax elements of a coded unit; means for binarizing the one or more syntax elements to obtain a plurality of bins; means for initializing a respective probability state for each bin of the plurality of bins for the one or more syntax elements based on a comparison of a parameter associated with the coded unit and a respective threshold of a plurality of thresholds; means for performing binary arithmetic coding on the plurality of bins of the one or more syntax elements to obtain encoded representations of the one or more syntax elements using a respective probability state for the bin; and means for outputting a video bitstream including the encoded representations of the one or more syntax elements.

The details of one or more examples are set forth in the accompanying drawings and the description below. Other features, objects, and advantages will be apparent from the description and drawings, and from the claims.

DETAILED DESCRIPTION

This disclosure describes techniques for entropy coding, such as, but not limited to, binary arithmetic coding (BAC). In some examples, the techniques of this disclosure may be used in a context adaptive binary arithmetic coding (CABAC) process during video coding. For example, such techniques may be performed in video encoders and video decoders configured to perform such techniques. The coding (i.e., encoding or decoding) techniques described in this disclosure also may be applicable to other types of data coding. Video coding will be described for purposes of illustration in this disclosure.

Entropy coding video data using a probability initialization may increase a compression rate of video data transmitted, which may reduce an amount of video data transmitted. For example, when coding (e.g., encoding, decoding, etc.) a block at a pre-defined location of a slice, a video coder may store or initialize current probability states for a current slice as an initial probability state for a subsequent slice. In this way, probability states for a subsequent slice may be initialized using probability states for the current slice. However, the current probability states for a current slice when coding the block at a pre-defined location of a slice may generate a probability initialization that is not optimal for the subsequent block, which may reduce the compression rate of the video data transmitted.

In general, this disclosure describes techniques for binary arithmetic coding in video coding such that probability states are initialized to improve compression of the binary arithmetic coding, and video encoders and video decoders for performing such techniques. In some examples, the techniques of this disclosure may perform a signaling scheme that allows an encoder and/or decoder to choose a set of probability initializations among multiple candidates. In some examples, the techniques of this disclosure may include per-context probability initialization. In some examples, the techniques of this disclosure may provide more flexible probability state initialization.

Figure 1:
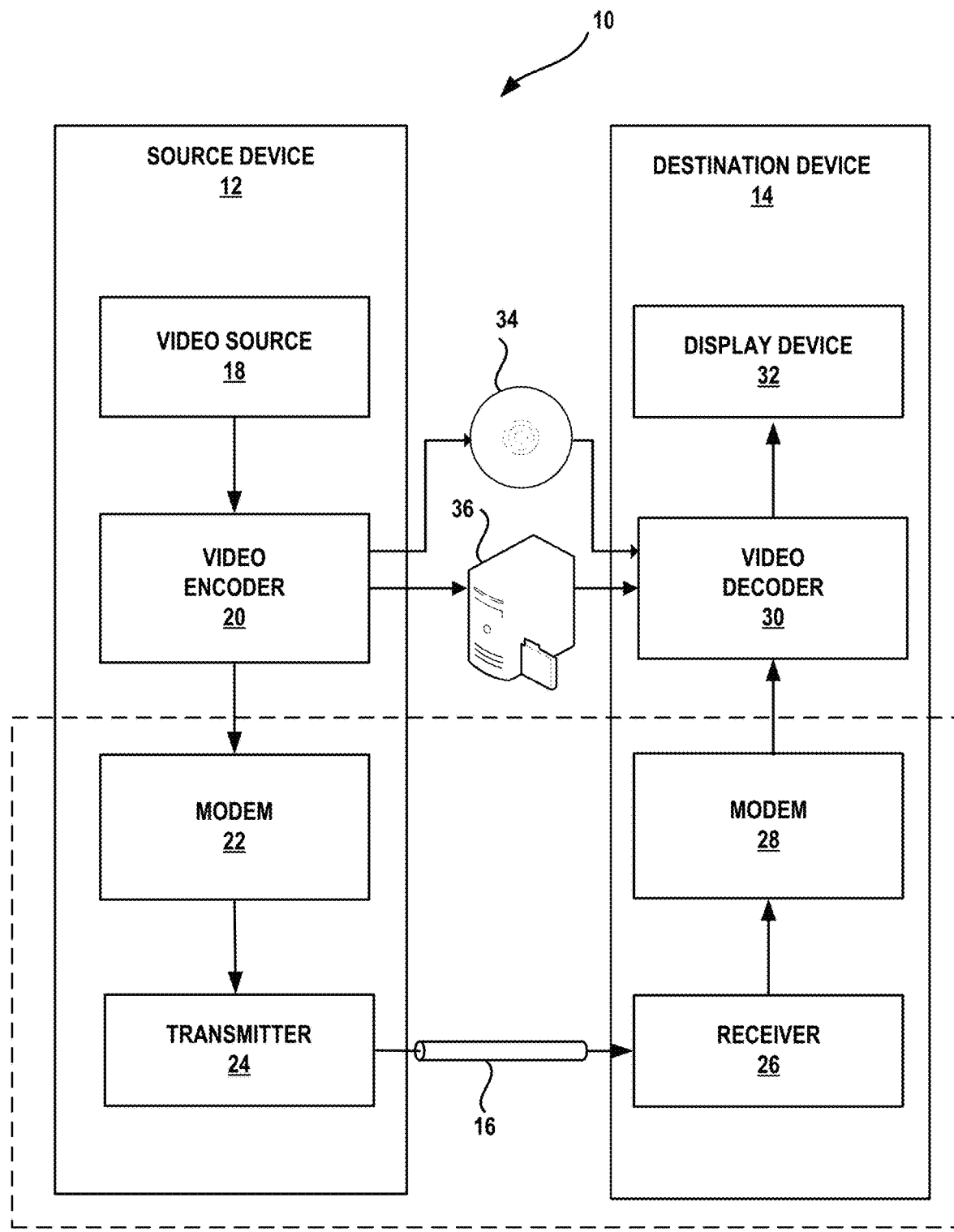
FIG. 1 is a block diagram illustrating an example video encoding and decoding system.

FIG. 1 is a block diagram illustrating an example video encoding and decoding system 10 that may be configured to utilize techniques for BAC in a video coding process in accordance with examples of this disclosure. As shown in FIG. 1, system 10 includes source device 12 that transmits encoded video to destination device 14 via communication channel 16. Encoded video data may also be stored on storage medium 34 or file server 36 and may be accessed by destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device that is separate from video decoder 30, such as a network interface, CD or DVD reader, or the like, may retrieve coded video data from a storage medium and provided the retrieved data to video decoder 30.

Source device 12 and destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices (e.g., a wireless communication device) may be equipped for wireless communication. Hence, communication channel 16 may comprise a wireless channel, a wired channel, or a combination of wireless and wired channels suitable for transmission of encoded video data. Similarly, file server 36 may be accessed by destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for BAC in a video coding process, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, modulator/demodulator 22 and transmitter 24. In source device 12, video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications, or application in which encoded video data is stored on a local disk.

The captured, pre-captured, or computer-generated video may be encoded by video encoder 20. The encoded video information may be modulated by modem 22 according to a communication standard, such as a wireless communication protocol, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

The captured, pre-captured, or computer-generated video that is encoded by video encoder 20 may also be stored onto storage medium 34 or file server 36 for later consumption. Storage medium 34 may include Blu-ray discs, DVDs, CD-ROMs, flash memory, or any other suitable digital storage media for storing encoded video. The encoded video stored on storage medium 34 may then be accessed by destination device 14 for decoding and playback.

File server 36 may be any type of server capable of storing encoded video and transmitting that encoded video to destination device 14. Example file servers include a web server (e.g., for a website), an FTP server, network attached storage (NAS) devices, a local disk drive, or any other type of device capable of storing encoded video data and transmitting it to a destination device. The transmission of encoded video data from file server 36 may be a streaming transmission, a download transmission, or a combination of both. File server 36 may be accessed by destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

Destination device 14, in the example of FIG. 1, includes receiver 26, modem 28, video decoder 30, and display device 32. Receiver 26 of destination device 14 receives information over channel 16, and modem 28 demodulates the information to produce a demodulated bitstream for video decoder 30. The information communicated over channel 16 may include a variety of syntax information generated by video encoder 20 for use by video decoder 30 in decoding video data. Such syntax may also be included with the encoded video data stored on storage medium 34 or file server 36. Each of video encoder 20 and video decoder 30 may form part of a respective encoder-decoder (CODEC) that is capable of encoding or decoding video data.

Display device 32 may be integrated with, or external to, destination device 14. In some examples, destination device 14 may include an integrated display device and may also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 may operate according to a video compression standard, such as the HEVC standard, or any future standard. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263. For example, video encoder 22 and video decoder 30 may be configured to operate according to other video coding techniques and/or standards, including new video coding techniques being explored by the Joint Video Exploration Team (WET). The Joint Exploratory Model (JEM) is the test model used by the JVET for studying video coding techniques.

An early draft for new video coding standard, referred to as the H.266/Versatile Video Coding (VVC) standard, is available in the document JVET-J1001 "Versatile Video Coding (Draft 1)" by Benjamin Bross, and its algorithm description is available in the document JVET-J1002 "Algorithm description for Versatile Video Coding and Test Model 1 (VTM 1)" by Jianle Chen and Elena Alshina. The techniques of this disclosure, however, are not limited to any particular coding standard. Video encoder 20 and video decoder 30 may operate according to any video coding standard, such as HEVC, VVC, proprietary or other industry standards, such as the Joint Exploration Test Model (JEM), etc. The techniques of this disclosure, however, are not limited to any particular coding standard.

Video encoder 20 and video decoder 30 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video encoder 20 may implement any or all of the techniques of this disclosure for BAC in a video coding process. Likewise, video decoder 30 may implement any or all of these techniques BAC in a video coding process. A video coder, as described in this disclosure, may refer to a video encoder or a video decoder. Similarly, a video coding unit may refer to a video encoder or a video decoder. In this context, a video coding unit is physical hardware and differs from the CU data structure discussed above. Likewise, video coding may refer to video encoding or video decoding.

As will be discussed in more detail below, in one example of the disclosure, video decoder 30 may be configured to receive video data including coded representations of one or more syntax elements of a coded unit, initialize respective probability states for each bin, perform inverse binary arithmetic coding on the coded representations of the one or more syntax elements to obtain the bins, inverse binarize the bins to obtain syntax elements, and decode the video data based on the one or more syntax elements.

Likewise, video encoder 20 may be configured to encode video data to generate syntax elements, binarize the one or more syntax elements to obtain bins, initialize respective a probability state for each bin, perform binary arithmetic coding on the bins to obtain encoded representations of the one or more syntax elements, and output a video bitstream including the encoded representations of the one or more syntax elements.

Digital video devices implement video compression techniques, such as those performed by video encoder 20 and video decoder 30, to encode and decode digital video information more efficiently. Video compression may apply spatial (intra-frame) prediction and/or temporal (inter-frame) prediction techniques to reduce or remove redundancy inherent in video sequences.

For video coding according to the High-Efficiency Video Coding (HEVC or H.265) standard, as one example, a video frame may be partitioned into coding units. A coding unit (CU) generally refers to an image region that serves as a basic unit to which various coding tools are applied for video compression. A CU usually has a luminance component, which may be denoted as Y, and two chroma components, which may be denoted as Cr and Cb. Depending on the video sampling format, the size of the Cr and Cb components, in terms of number of samples, may be the same as or different from the size of the Y component. A CU is typically square, and may be considered to be similar to a so-called macroblock, e.g., under other video coding standards such as ITU-T H.264.

The luma and chroma components of pixels in a CU may be coded in different sub-sampling formats. In one proposal for HEVC, the luma and chroma components of a pixel are coded in a 4:2:0 format. In a 4:2:0 pixel format, for every 4×2 block of pixels, there are eight luma components (4 in each row) and 2 chroma components (e.g., 1 Cr chroma component and 1 Cb chroma component in the first row of the 4×2 block). The second row of the 4×2 block would have no chroma information. As such, in a 4×2 block of pixels, the chroma components are sampled at ½ horizontal resolution and ½ vertical resolution. However, video coding techniques are not limited to 4:2:0 chroma sub-sampling. Other sub-sampling formats may be used, including 4:2:2 and 4:4:4. In a 4:2:2 pixel format, for every 4×2 block of pixels, there are eight luma components (4 in each row) and 4 chroma components (e.g., 1 Cr chroma component and 1 Cb chroma component in each of the first and second row of the 4×2 block). As such, for a 4:2:2 format, the chroma components are sampled at ½ horizontal resolution and full vertical resolution. The 4:4:4 pixel format involves no sub-sampling of chroma components. That is, for a 4×2 block of pixels, there are eight luma components, eight Cr components, and eight Cb components. These or other sampling formats could be used.

To achieve better coding efficiency, a coding unit may have variable sizes depending on video content. In addition, a coding unit may be split into smaller blocks for prediction or transform. In particular, each coding unit may be further partitioned into prediction units (PUs) and transform units (TUs). PUs may be considered to be similar to so-called partitions under other video coding standards, such as H.264. TUs refer to blocks of residual data to which a transform is applied to produce transform coefficients.

Coding according to some of aspects of the HEVC standard will be described in this application for purposes of illustration. However, the techniques described in this disclosure may be useful for other video coding processes, such as those defined according to H.264, VVC, or other standard or proprietary video coding processes.

HEVC standardization efforts were based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-five intra-prediction encoding modes.

Figure 2A:
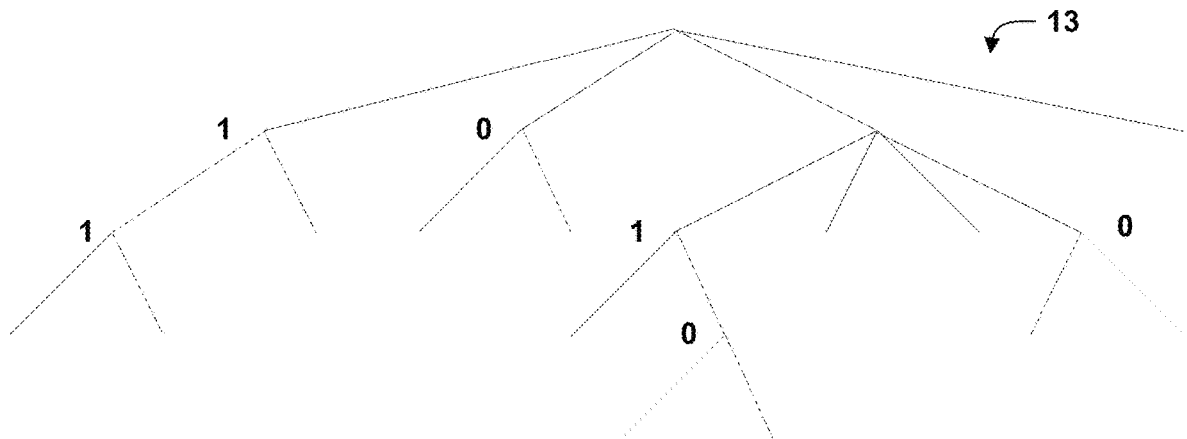
FIGS. 2A and 2B are conceptual diagrams illustrating an example quadtree binary tree (QTBT) structure, and a corresponding coding tree unit (CTU).
Figure 2B:
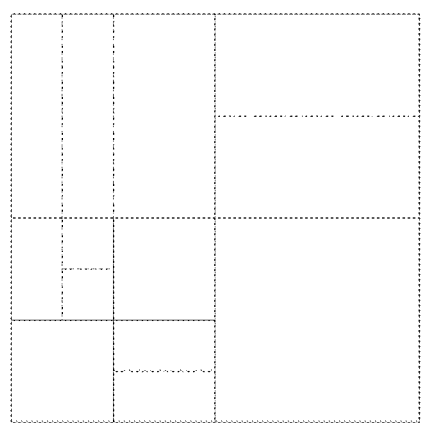

FIGS. 2A and 2B are conceptual diagram illustrating an example quadtree binary tree (QTBT) structure 13, and a corresponding coding tree unit (CTU) 15. A video encoder may apply the concepts illustrated in FIGS. 2A and 2B to generate video data to be entropy encoded in a video bitstream using a context initialization. In some examples, a video decoder may apply the concepts illustrated in FIGS. 2A and 2B to entropy decode video data in a video bitstream using a context initialization. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 20 may encode, and video decoder 30 may decode, syntax elements (such as splitting information) for a region tree level of QTBT structure 13 (i.e., the solid lines) and syntax elements (such as splitting information) for a prediction tree level of QTBT structure 13 (i.e., the dashed lines). Video encoder 20 may encode, and video decoder 30 may decode, video data, such as prediction and transform data, for CUs represented by terminal leaf nodes of QTBT structure 13.

In general, CTU 15 of FIG. 2B may be associated with parameters defining sizes of blocks corresponding to nodes of QTBT structure 13 at the first and second levels. These parameters may include a CTU size (representing a size of CTU 15 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 13 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 13 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

According to the HM, a CU may include one or more prediction units (PUs) and/or one or more transform units (TUs). Syntax data within a video bitstream may define a largest coding unit (LCU) or coding tree block (CTB), which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a video bitstream may define a maximum number of times an LCU may be split, referred to as CU depth. Accordingly, a video bitstream may also define a smallest coding unit (SCU). This disclosure also uses the term "block", "partition," or "portion" to refer to any of a CU, PU, or TU. In general, "portion" may refer to any sub-set of a video frame.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU.

Moreover, TUs of leaf-CUs may also be associated with respective quadtree data structures. That is, a leaf-CU may include a quadtree indicating how the leaf-CU is partitioned into TUs. This disclosure refers to the quadtree indicating how an LCU is partitioned as a CU quadtree and the quadtree indicating how a leaf-CU is partitioned into TUs as a TU quadtree. The root node of a TU quadtree generally corresponds to a leaf-CU, while the root node of a CU quadtree generally corresponds to an LCU. TUs of the TU quadtree that are not split are referred to as leaf-TUs.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is not predictively coded, intra-prediction mode encoded, or inter-prediction mode encoded. For intra coding, a PU may be treated the same as a leaf transform unit described below.

To code a block (e.g., a prediction unit (PU) of video data), a predictor for the block is first derived. The predictor can be derived either through intra (I) prediction (i.e. spatial prediction) or inter (P or B) prediction (i.e. temporal prediction). Hence, some prediction units may be intra-coded (I) using spatial prediction with respect to neighbouring reference blocks in the same frame, and other prediction units may be inter-coded (P or B) with respect to reference blocks in other frames. The reference blocks used for prediction may include actual pixel values at so-called integer pixel positions as reference samples, or synthesized pixel values produced by interpolation at fractional pixel positions as reference samples.

Upon identification of a predictor, the difference between the original video data block and its predictor is calculated. This difference is also called the prediction residual and refers to the pixel differences between the pixels of the block to be coded and corresponding reference samples (which may be integer-precision pixels or interpolated fractional-precision pixels, as mentioned above) of the reference block, i.e., predictor. To achieve better compression, the prediction residual (i.e., the array of pixel difference values) is generally transformed from the pixel (i.e., spatial) domain to a transform domain, e.g., using a discrete cosine transform (DCT), integer transform, Karhunen-Loeve (K-L) transform, wavelet transform, or other transform. The transform domain may be, for example, a frequency domain.

Coding a PU using inter-prediction involves calculating a motion vector between a current block and a block in a reference frame. Motion vectors are calculated through a process called motion estimation (or motion search). A motion vector, for example, may indicate the displacement of a prediction unit in a current frame relative to a reference sample of a reference frame. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice. In some examples, the reference sample may be interpolated, in whole or in part, and occur at a fractional pixel position. Upon finding a portion of the reference frame that best matches the current portion, the encoder determines the current motion vector for the current portion as the difference in the location from the current portion to the matching portion in the reference frame (e.g., from the center of the current portion to the center of the matching portion).

JEM/VVC also provides an affine motion compensation mode, which may be considered an inter-prediction mode. In affine motion compensation mode, video encoder 20 may determine two or more motion vectors that represent non-translational motion, such as zoom in or out, rotation, perspective motion, or other irregular motion types.

To perform intra-prediction, video encoder 20 may select an intra-prediction mode to generate the prediction block. Examples of JEM/VVC provides sixty-seven intra-prediction modes, including various directional modes, as well as planar mode and DC mode. In general, video encoder 20 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 20 codes CTUs and CUs in raster scan order (left to right, top to bottom).

In some examples, an encoder may signal the motion vector for each portion in the encoded video bitstream. The signaled motion vector is used by the decoder to perform motion compensation in order to decode the video data. However, signaling the original motion vector directly may result in less efficient coding, as a large number of bits are typically needed to convey the information.

Once motion estimation is performed to determine a motion vector for a current portion, the encoder compares the matching portion in the reference frame to the current portion. This comparison typically involves subtracting the portion (which is commonly referred to as a "reference sample") in the reference frame from the current portion and results in so-called residual data, as mentioned above. The residual data indicates pixel difference values between the current portion and the reference sample. The encoder then transforms this residual data from the spatial domain to a transform domain, such as the frequency domain. Usually, the encoder applies a discrete cosine transform (DCT) to the residual data to accomplish this transformation. The encoder performs this transformation in order to facilitate the compression of the residual data because the resulting transform coefficients represent different frequencies, wherein the majority of energy is usually concentrated on a few low frequency coefficients.

Typically, the resulting transform coefficients are grouped together in a manner that enables entropy coding, especially if the transform coefficients are first quantized (rounded). The encoder then performs statistical lossless (or so-called "entropy") encoding to further compress the run-length coded quantized transform coefficients. After performing lossless entropy coding, the encoder generates a video bitstream that includes the encoded video data. Examples of entropy coding includes CABAC, context adaptive variable length coding (CAVLC), probability interval partitioning entropy coding (PIPE), Golomb coding, Golomb-Rice coding, exponential Golomb coding, syntax-based context-adaptive binary arithmetic coding (SBAC), or other entropy coding methodologies.

The following section will describe BAC and CABAC techniques in more detail. BAC, in general, is a recursive interval-subdividing procedure. BAC is used to encode bins of one or more syntax elements of a coded unit in the CABAC process in the H.264/AVC video coding standard, in the HEVC video coding standard, in the VVC standard, and in other video coding standards. As used herein, a coded unit may refer to a slice, picture, LCU, or another coded unit. The one or more syntax elements may be any data structures that represent video data or how the video data is coded, including syntax elements representing coding modes, motion vectors, transform coefficients representative of residual values, etc. The output of the BAC coder is a binary stream (e.g., coded representations of bins of one or more syntax elements of a coded unit) that represents a value or pointer to a probability within a final coded probability interval. In some examples, the probability interval (also called an arithmetic coding interval) is specified by a range and a lower end value. Range is the extent of the probability interval. Low is the lower bound of the coding interval.

Application of arithmetic coding to video coding is described in D. Marpe, H. Schwarz, and T. Wiegand "Context-Based Adaptive Binary Arithmetic Coding in the H.264/AVC Video Compression Standard," IEEE Trans. Circuits and Systems for Video Technology, vol. 13, no. 7, July 2003, which is incorporated by reference herein. Each context (i.e., probability model) in CABAC is represented by a state. Each state ($\sigma$) implicitly represents a probability ($p_\sigma$) of a particular symbol (e.g., a bin of a binarized syntax element) being the Least Probable Symbol (LPS). A symbol can be an LPS or a Most Probable Symbol (MPS). Symbols are binary, and as such, the MPS and the LPS can be 0 or 1. The probability is estimated for the corresponding context and used (implicitly) to entropy code the symbol using the arithmetic coder.

In some examples, the BAC process is performed by a state machine that changes the internal values 'range' and 'low' depending on the context to code and the value of the bin being coded. Depending on the state of a context (that is, its probability), the range is divided into rangeMPS$_\sigma$ (range of the most probable symbol in state$_\sigma$) and rangeLPS$_\sigma$ (range of the least probable symbol in state$_\sigma$). In theory, the rangeLPS$_\sigma$ value of a probability state, is derived by a multiplication:

rangeLPS$_\sigma$=range×$p_\sigma$, where $p_\sigma$ is the probability to select the LPS. In some examples, the multiplication to determine rangeLPS$_\sigma$ may be performed directly by video encoder 20 and video decoder 30. In other examples, video encoder 20 and video decoder 30 may store a table of computed multiplications. Video encoder 20 and video decoder 30 may use indexes to the table (the indexes based on possible values of range and $p_\sigma$) to determine the value of rangeLPS$_\sigma$. Of course, the probability of MPS is 1-$p_\sigma$. Equivalently, the rangeMPS$_\sigma$ is equal to range minus rangeLPS$_\sigma$. BAC iteratively updates the range depending on the state of the context bin to code, the current range, and the value of the bin being coded (i.e., is the bin equal to the LPS or the MPS).

Figure 3A:
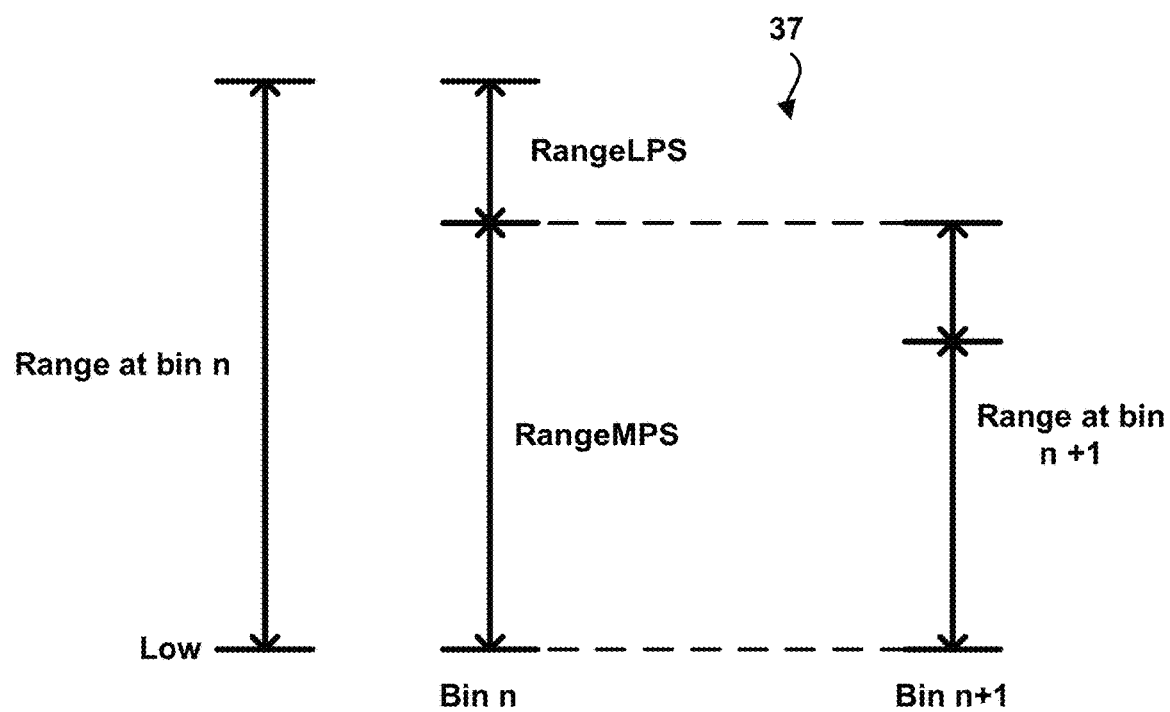
FIGS. 3A and 3B are conceptual diagrams illustrating a range update process in binary arithmetic coding.
Figure 3B:
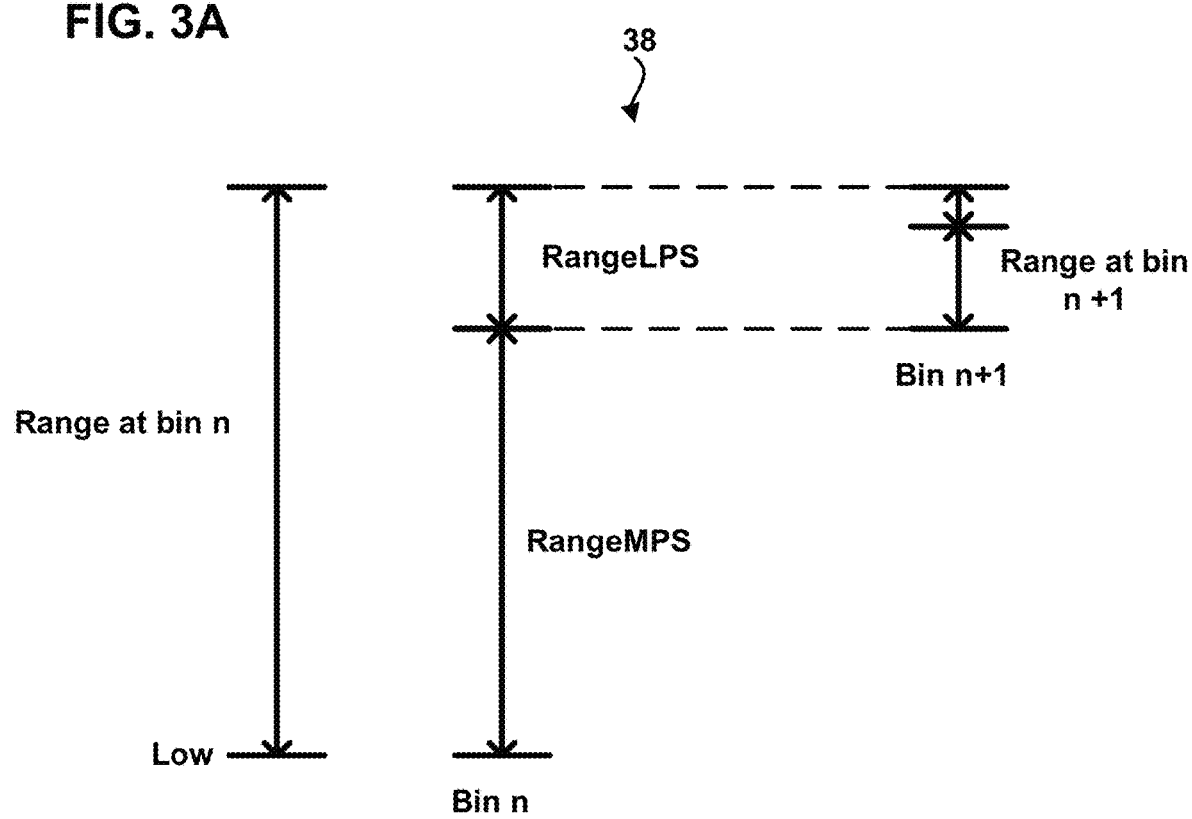

FIGS. 3A and 3B show examples of this process at bin n. In example 37 of FIG. 3A, the range at bin N includes the RangeMPS and RangeLPS given by the probability of the LPS ($p_\sigma$) given a certain context state ($\sigma$). Example 37 shows the update of the range at bin n+1 when the value of bin n is equal to the MPS. In this example, the low stays the same, but the value of the range at bin n+1 is reduced to the value of RangeMPS at bin n. Example 38 of FIG. 3B shows the update of the range at bin n+1 when the value of bin n is not equal to the MPS (i.e., equal to the LPS). In this example, the low is moved to the lower range value of RangeLPS at bin n. In addition, the value of the range at bin n+1 is reduced to the value of RangeLPS at bin n.

In one example, range is expressed with 9 bits and the low with 10 bits. In some examples, video encoder 20 and video decoder 30 may be configured to perform a renormalization process to maintain the range and low values at some predetermined level of precision. In one example, video encoder 20 and video decoder 30 may perform the renormalization whenever the range is less than 256. Therefore, in this example, the range is always equal or larger than 256 after renormalization. Depending on the values of range and low, the BAC process outputs to the video bitstream, a '0,' or a '1,' or updates an internal variable (called BO: bits-outstanding) to keep for future outputs.

Figure 4:
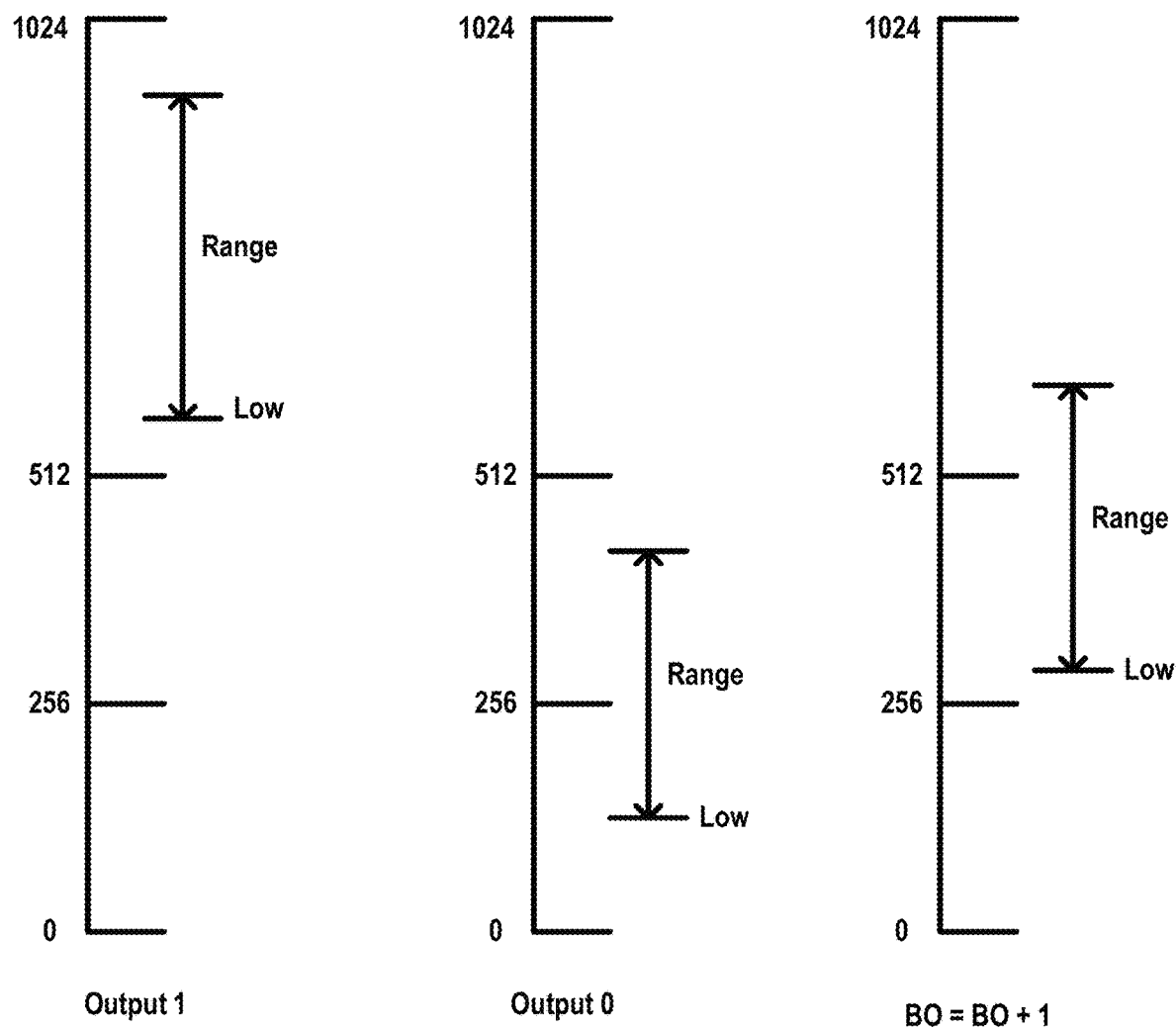
FIG. 4 is a conceptual diagram illustrating an output process in binary arithmetic coding.

FIG. 4 shows examples of BAC output depending on the range. For example, a '1' is output to the video bitstream when the range and low are above a certain threshold (e.g., 512). A '0' is output to the video bitstream when the range and low are below a certain threshold (e.g., 512). Nothing is output to the video bitstream when the range and lower are between certain thresholds. Instead, the BO value is incremented, and the next bin is encoded.

In the CABAC context model of H.264/AVC, and in some proposals for HEVC, there are 128 states. While an example using H.264/AVC is used, other examples may use other standards, such as, but not limited to, the VVC standard. In the H.264/AVC example, there are 64 possible LPS probabilities (denoted by state $\sigma$) that can be from 0 to 63. Each MPS can be zero or one. As such, the 128 states are 64 state probabilities times the 2 possible values for MPS (0 or 1). Therefore, the state can be indexed with 7 bits.

In some examples, to reduce the computation of deriving LPS ranges (rangeLPS$_\sigma$), results for all cases are pre-calculated and stored as approximations in a look-up table in H.264/AVC and in some proposals for HEVC. Therefore, the LPS range (rangeLPS$_\sigma$) can be obtained without any multiplication by using a simple table lookup. Avoiding multiplication can be important for some devices or applications, since this operation may cause significant latency in many hardware architectures.

In one example, a 4-column pre-calculated LPS range table is used instead of the multiplication. The range is divided into four segments. The segment index can be derived by the question (range>>6)&3. In effect, the segment index is derived by shifting and dropping bits from the actual range. The following Table 1 shows the possible ranges and their corresponding indexes.

TABLE 1

| Range Index | | | | |
|---|---|---|---|---|
| Range | 256-319 | 320-383 | 384-447 | 448-511 |
| (range >> 6) & 3 | 0 | 1 | 2 | 3 |

The LPS range table has then 64 entries (one for each probability state) times 4 (one for each range index). Each entry is the Range LPS, that is, the value of multiplying the range times the LPS probability. An example of part of this table is shown in the following Table 2. Table 2 depicts probability states 9-12. In one proposal for HEVC, the probability states may range from 0-63.

TABLE 2

| | RangeLPS | | | |
|---|---|---|---|---|
| Prob State ($\sigma$) | Index 0 | Index | Index 2 | Index 3 |
| ... | ... | ... | ... | ... |
| 9 | 90 | 110 | 130 | 150 |
| 10 | 85 | 104 | 123 | 142 |
| 11 | 81 | 99 | 117 | 135 |
| 12 | 77 | 94 | 111 | 128 |
| ... | ... | ... | ... | ... |

In each segment (i.e., range value), the LPS range of each probability state, is pre-defined. In other words, the LPS range of a probability state, is quantized into four values (i.e., one value for each range index). The specific LPS range used at a given point depends on which segment the range belongs to. The number of possible LPS ranges used in the table is a trade-off between the number of table columns (i.e., the number of possible LPS range values) and the LPS range precision. Generally speaking, more columns results in smaller quantization errors of LPS range values, but also increases the need for more memory to store the table. Fewer columns increases quantization errors, but also reduces the memory needed to store the table.

As described above, each LPS probability state has a corresponding probability. The probability for each state is derived as follows:

$$p_\sigma = \alpha p_{\sigma-1}$$

where the state $\sigma$ is from 0 to 63. The constant $\alpha$ represents the amount of probability change between each context state. In one example, $\alpha=0.9493$, or, more precisely, $\alpha=(0.01875/0.5)^{1/63}$. The probability at state $\sigma=0$ is equal to 0.5 (i.e., $p_0=1/2$). That is, at context state 0, the LPS and MPS are equally probable. The probability at each successive state is derived by multiplying the previous state by $\alpha$. As such, the probability of the LPS occurring at context state $\alpha=1$ is $p_0*0.9493$ ($0.5*0.9493=0.47465$). As such, as the index of state $\alpha$ increases, the probability of the LPS occurring goes down.

CABAC is adaptive because the probability states are updated in order to follow signal statistics (e.g., the values of previously coded bins). The update process is as follows. For a given probability state, the update depends on the state index and the value of the encoded symbol identified either as an LPS or an MPS. As a result of the updating process, a new probability state is derived, which consists of a potentially modified LPS probability estimate and, if necessary, a modified MPS value.

In the event of a bin value equaling the MPS, a given state index is simply incremented by 1. This is performed for all states, except when an MPS occurs at state index 62, where the LPS probability is already at its minimum (or equivalently, the maximum MPS probability is reached). In this case, the state index 62 remains fixed until an LPS is seen, or the last bin value is encoded (state 63 is used for the special case of the last bin value). When an LPS occurs, the state index is changed by decrementing the state index by a certain amount, as shown in the equation below. This rule applies in general to each occurrence of an LPS, with the following exception. Assuming a LPS has been encoded at the state with index $\sigma=0$, which corresponds to the equi-probable case, the state index remains fixed, but the MPS value will be toggled such that the value of the LPS and MPS will be interchanged. In all other cases, no matter which symbol has been encoded, the MPS value will not be altered. The derivation of the transition rules for the LPS probability is based on the following relation between a given LPS probability $p_{old}$ and its updated counterpart $p_{new}$:

$$p_{new} = \max(\alpha p_{old}, p_{62}) \text{ if a MPS occurs}$$

$$p_{new} = (1-\alpha) + \alpha p_{old} \text{ if a LPS occurs}$$

In one example practical implementation of the probability estimation process in CABAC, transition rules may be realized by at most two tables each having 63 entries of 6-bit unsigned integer values. In some examples, state transitions may be determined with a single table TransIdxLPS, which determines, for a given state index $\sigma$, the new updated state index TransIdxLPS [$\sigma$] in case an LPS has been observed. The MPS-driven transitions can be obtained by a simple (saturated) increment of the state index by the fixed value of 1, resulting in an updated state index min($\sigma$+1, 62). Table 3 below is an example of a partial TransIdxLPS table.

TABLE 3

| TransIdxLPS | |
|---|---|
| Prob State ($\sigma$) | New State TransIdxLPS [$\sigma$] |
| ... | ... |
| 9 | 6 |
| 10 | 8 |
| 11 | 8 |
| 12 | 8 |
| ... | ... |

Figure 5:
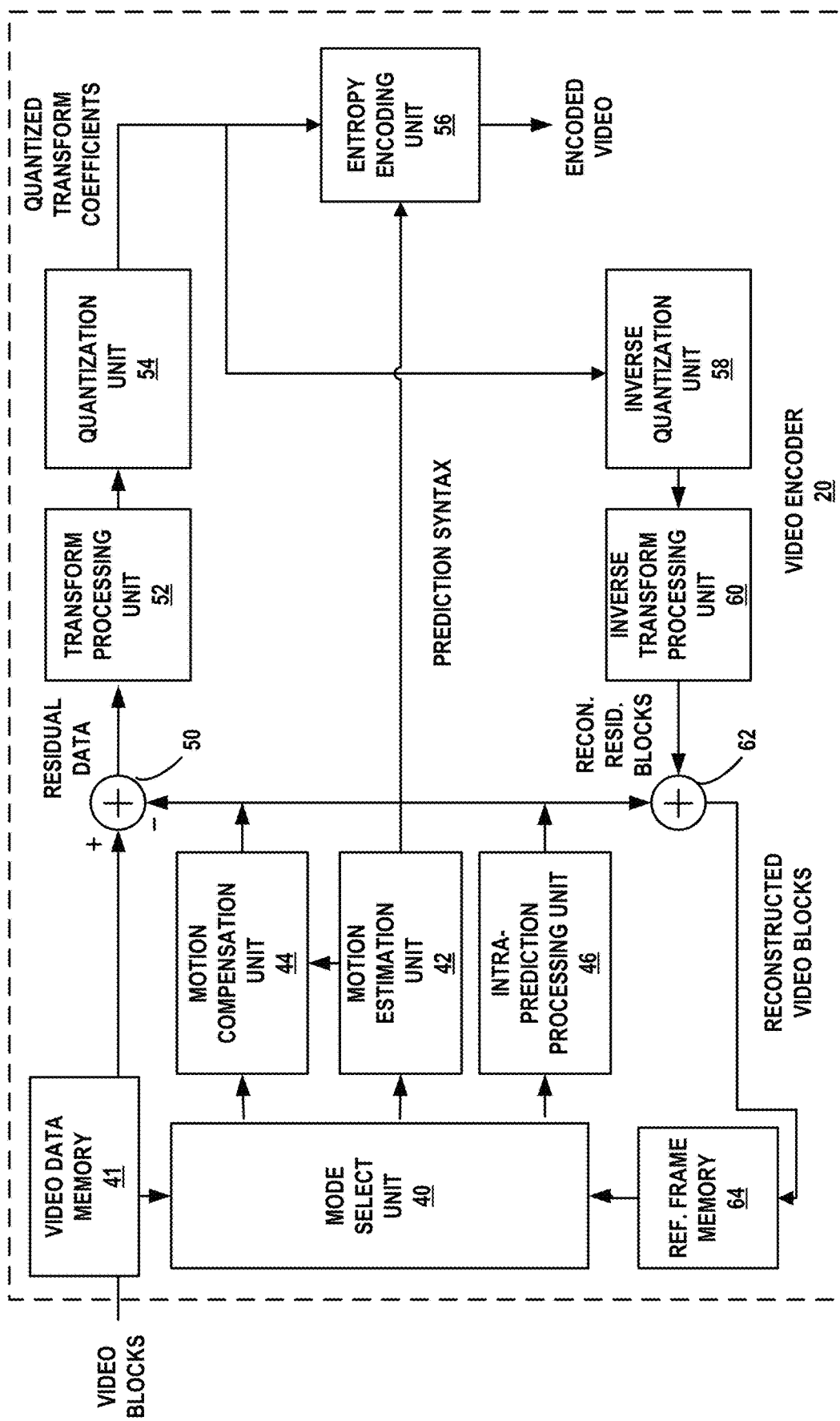
FIG. 5 is a block diagram illustrating an example video encoder.

FIG. 5 is a block diagram illustrating an example of video encoder 20 that may be configured to utilize techniques for BAC coding, as described in this disclosure. Video encoder 20 will be described in the context of HEVC coding and VVC for purposes of illustration, but without limitation of this disclosure as to other coding standards or methods. For example, video encoder 20 may operating according to future video coding standards, including H.266 and VVC. Video encoder 20 may perform intra- and inter-coding of CUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes. JEM/VVC also provides an affine motion compensation mode, which may be considered an inter-prediction mode.

As shown in FIG. 5, video encoder 20 receives a current video block within a video frame to be encoded. In the example of FIG. 5, video encoder 20 includes video data memory 41, mode select unit 40, motion compensation unit 44, motion estimation unit 42, intra-prediction processing unit 46, reference frame memory 64 (e.g., a decoded picture buffer), summer 50, transform processing unit 52, quantization unit 54, and entropy encoding unit 56. The transform processing unit 52 illustrated in FIG. 5 is the unit that applies the actual transform or combinations of transform to a block of residual data, and is not to be confused with block of transform coefficients, which also may be referred to as a transform unit (TU) of a CU. For video block reconstruction, the video encoder 20 also includes inverse quantization unit 58, inverse transform processing unit 60, and summer 62. A deblocking filter (not shown in FIG. 5) may also be included to filter block boundaries to remove blockiness artifacts from reconstructed video. If desired, the deblocking filter would typically filter the output of summer 62.

Video data memory 41 may be configured to store video data to be encoded by the components of video encoder 20. The video data stored in video data memory 41 may be obtained, for example, from video source 18. Reference frame memory 64 may be a reference picture memory (decoded picture buffer) that stores reference video data for use in encoding video data by video encoder 20, e.g., in intra- or inter-coding modes. Video data memory 41 and reference frame memory 64 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 41 and reference frame memory 64 may be provided by the same memory device or separate memory devices. In various examples, video data memory 41 may be on-chip with other components of video encoder 20, or off-chip relative to those components.

During the encoding process, video encoder 20 receives a video frame or slice to be coded. The frame or slice may be divided into multiple video blocks, e.g., largest coding units (LCUs). Motion estimation unit 42 and the motion compensation unit 44 perform inter-predictive coding of the received video block relative to one or more blocks in one or more reference frames to provide temporal compression. Intra-prediction processing unit 46 may perform intra-predictive coding of the received video block relative to one or more neighboring blocks in the same frame or slice as the block to be coded to provide spatial compression.

Mode select unit 40 may select one of the coding modes, intra or inter, e.g., based on error (i.e., distortion) results for each mode, and provides the resulting intra- or inter-predicted block (e.g., a prediction unit (PU)) to summer 50 to generate residual block data and to the summer 62 to reconstruct the encoded block for use in a reference frame. Summer 62 combines the predicted block with inverse quantized, inverse transformed data from inverse transform processing unit 60 for the block to reconstruct the encoded block, as described in greater detail below. Some video frames may be designated as I-frames, where all blocks in an I-frame are encoded in an intra-prediction mode. In some cases, intra-prediction processing unit 46 may perform intra-prediction encoding of a block in a P- or B-frame, e.g., when motion search performed by motion estimation unit 42 does not result in a sufficient prediction of the block.

Motion estimation unit 42 and motion compensation unit 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample of a reference frame. Motion estimation unit 42 calculates a motion vector for a prediction unit of an inter-coded frame by comparing the prediction unit to reference samples of a reference frame stored in reference frame memory 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice, and not necessarily at a block (e.g., coding unit) boundary of the reference frame or slice. In some examples, the reference sample may occur at a fractional pixel position.

Motion estimation unit 42 sends the calculated motion vector and other syntax elements to entropy encoding unit 56 and motion compensation unit 44. The portion of the reference frame identified by a motion vector may be referred to as a reference sample. Motion compensation unit 44 may calculate a prediction value for a prediction unit of a current CU, e.g., by retrieving the reference sample identified by a motion vector for the PU.

Intra-prediction processing unit 46 may perform intra-prediction on the received block, as an alternative to inter-prediction performed by motion estimation unit 42 and motion compensation unit 44. Intra-prediction processing unit 46 may predict the received block relative to neighboring, previously coded blocks, e.g., blocks above, above and to the right, above and to the left, or to the left of the current block, assuming a left-to-right, top-to-bottom encoding order for blocks. Intra-prediction processing unit 46 may be configured with a variety of different intra-prediction modes. For example, intra-prediction processing unit 46 may be configured with a certain number of directional prediction modes, e.g., thirty-five directional prediction modes, based on the size of the CU being encoded.

Intra-prediction processing unit 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, intra-prediction processing unit 46 may calculate an error value for the prediction mode based on pixel differences between the PU and the received block to be encoded. Intra-prediction processing unit 46 may continue testing intra-prediction modes until an intra-prediction mode that yields an acceptable error value is discovered. Intra-prediction processing unit 46 may then send the PU to summer 50.

Video encoder 20 forms a residual block by subtracting the prediction data calculated by motion compensation unit 44 or intra-prediction processing unit 46 from the original video block being coded. Summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

Transform processing unit 52 may form one or more transform units (TUs) from the residual block. Transform processing unit 52 selects a transform from among a plurality of transforms. The transform may be selected based on one or more coding characteristics, such as block size, coding mode, or the like. Transform processing unit 52 then applies the selected transform to the TU, producing a video block comprising a two-dimensional array of transform coefficients. In addition, transform processing unit 52 may signal the selected transform partition in the encoded video bitstream.

Transform processing unit 52 may send the resulting transform coefficients to quantization unit 54. Quantization unit 54 may then quantize the transform coefficients. The quantization matrix may specify values that, with a quantization parameter, may be used to determine an amount of quantization to be applied to corresponding transform coefficients. Entropy encoding unit 56 may perform a scan of the quantized transform coefficients in the matrix according to a scanning mode. This disclosure describes entropy encoding unit 56 as performing the scan. However, it should be understood that, in other examples, other processing units, such as quantization unit 54, could perform the scan.

Once the transform coefficients are scanned into the one-dimensional array, entropy encoding unit 56 may apply entropy coding such as context-adaptive variable length coding (CAVLC), context-adaptive binary arithmetic coding (CABAC), probability interval partitioning entropy coding (PIPE), Golomb coding, Golomb-Rice coding, exponential Golomb coding, syntax-based context-adaptive binary arithmetic coding (SBAC), or another entropy coding methodology to the coefficients. Although reference is made to a variety of different entropy coding processes, in accordance with examples of this disclosure, entropy encoding unit 56 may be configured to perform the BAC techniques described above. For example, entropy encoding unit 56 may be configured to initialize a respective probability state for each bin of a plurality of bins for the one or more syntax elements based on a comparison of a parameter associated with the coded unit and a respective threshold of a plurality of thresholds and perform binary arithmetic coding on the plurality of bins of the one or more syntax elements to obtain encoded representations of the one or more syntax elements using a respective probability state for the bin.

To perform CABAC, entropy encoding unit 56 may select a context model to apply to a certain context to encode symbols to be transmitted. The context may relate to, for example, whether neighboring values are non-zero or not. Entropy encoding unit 56 may also entropy encode syntax elements, such as the signal representative of the selected transform. Following the entropy coding by entropy encoding unit 56, the resulting encoded video may be transmitted to another device, such as the video decoder 30, or archived for later transmission or retrieval.

Figure 6:
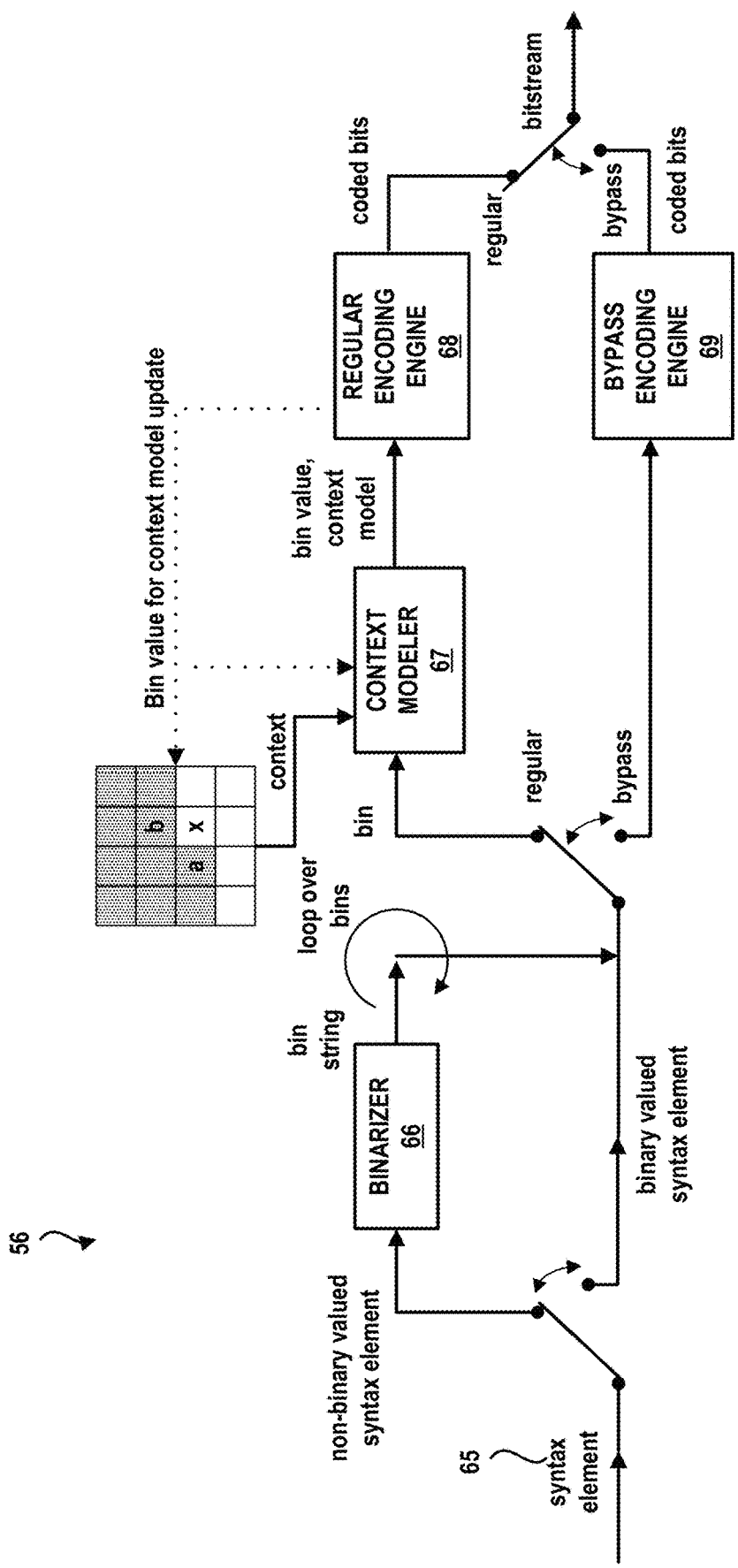
FIG. 6 is a block diagram illustrating a context adaptive binary arithmetic coder in a video encoder.

FIG. 6 is a block diagram of an example entropy encoding unit 56 that may be configured to perform CABAC in accordance with the techniques of this disclosure. A syntax element 65 is input into entropy encoding unit 56. If the syntax element is already a binary-value syntax element (i.e., a syntax element that only has a value of 0 and 1), the step of binarization may be skipped. If the syntax element is a non-binary valued syntax element (e.g., a syntax element represented by multiple bits, such as transform coefficient levels), the non-binary valued syntax element is binarized by binarizer 66. Binarizer 66 performs a mapping of the non-binary valued syntax element into a sequence of binary decisions. These binary decisions are often called "bins." For example, for transform coefficient levels, the value of the level may be broken down into successive bins, each bin indicating whether or not the absolute value of coefficient level is greater than some value. For example, bin 0 (sometimes called a significance flag) indicates if the absolute value of the transform coefficient level is greater than 0 or not. Bin 1 indicates if the absolute value of the transform coefficient level is greater than 1 or not, and so on. A unique mapping may be developed for each non-binary valued syntax element.

Each bin produced by binarizer 66 is fed to the binary arithmetic coding side of entropy encoding unit 56. That is, for a predetermined set of non-binary valued syntax elements, each bin type (e.g., bin 0) is coded before the next bin type (e.g., bin 1). Coding may be performed in either regular mode or bypass mode. In bypass mode, bypass coding engine 69 performs arithmetic coding using a fixed probability model, for example, using Golomb-Rice or exponential Golomb coding. Bypass mode is generally used for more predictable syntax elements.

Coding in regular mode involves performing CABAC. Regular mode CABAC is for coding bin values where the probability of a value of a bin is predictable given then values of previously coded bins. The probability of a bin being an LPS is determined by context modeler 67. Context modeler 67 outputs the bin value and the context model (e.g., the probability state σ.) The context model may be an initial context model for a series of bins, or may be determined based on the coded values of previously coded bins. As described above, the context modeler may update the state based on whether or not the previously-coded bin was an MPS or an LPS. After the context model and probability state σ is determined by context modeler 67, regular encoding engine 68 performs BAC on the bin value using the techniques of this disclosure described above.

Returning to FIG. 5, in some cases, entropy encoding unit 56 or another unit of video encoder 20 may be configured to perform other coding functions, in addition to entropy coding. For example, entropy encoding unit 56 may be configured to determine coded block pattern (CBP) values for CU's and PU's. Also, in some cases, entropy encoding unit 56 may perform run length coding of coefficients. In addition, entropy encoding unit 56, or other processing units, also may code other data, such as the values of a quantization matrix.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 7:
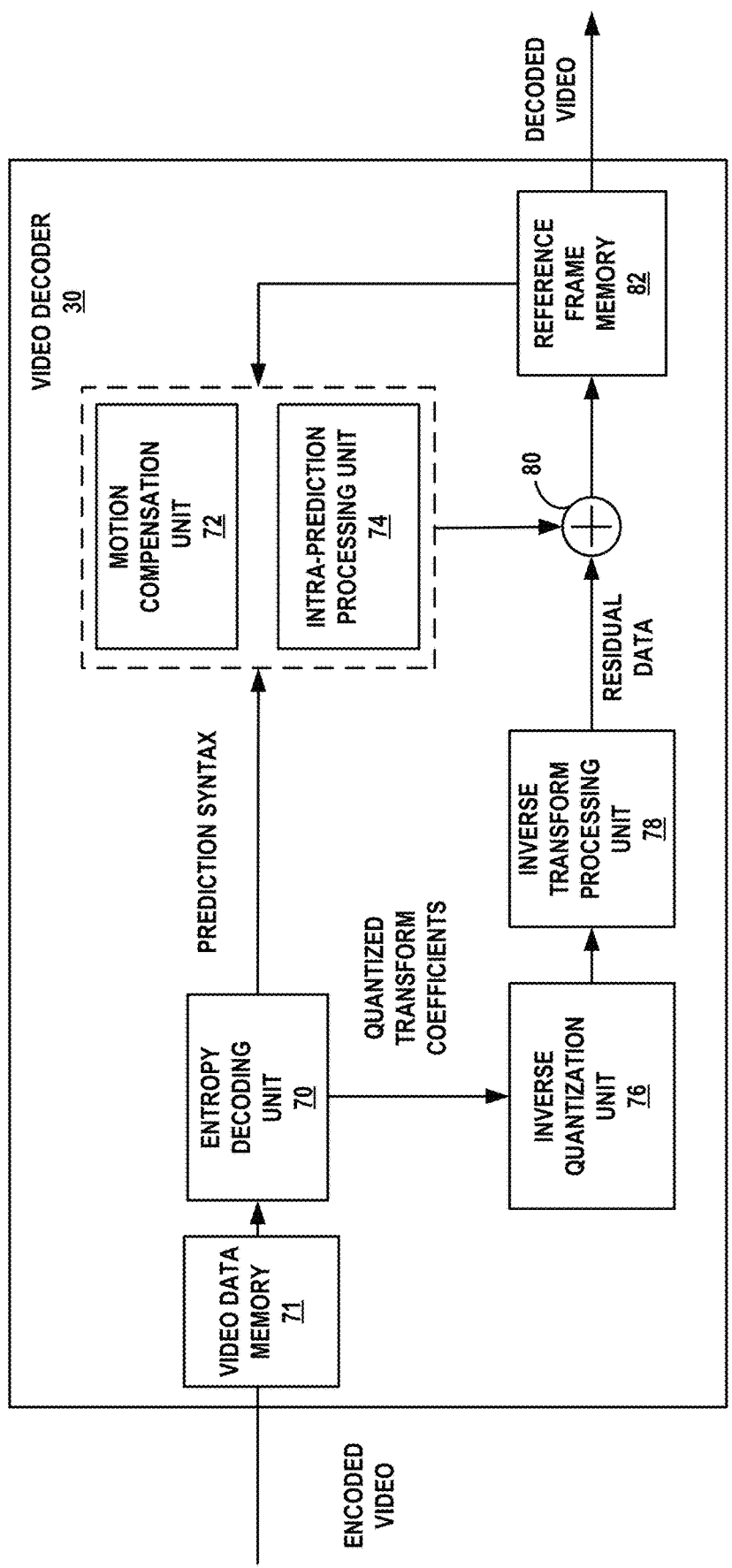
FIG. 7 is a block diagram illustrating an example video decoder.

FIG. 6 is a block diagram illustrating an example of a video decoder 30, which decodes an encoded video sequence. In the example of FIG. 7, the video decoder 30 includes video data memory 71, entropy decoding unit 70, motion compensation unit 72, intra-prediction processing unit 74, inverse quantization unit 76, inverse transformation unit 78, reference frame memory 82 (e.g., a decoded picture buffer) and summer 80. Video decoder 30 may, in some examples, perform a decoding pass generally reciprocal to the encoding pass described with respect to video encoder 20 (see FIG. 5).

Video data memory 71 may be configured to store video data to be decoded by the components of video decoder 30. The video data stored in video data memory 71 may be obtained, for example, from video encoder 20. Reference frame memory 82 may be a reference picture memory (decoded picture buffer) that stores reference video data for use in decoding video data by video decoder 30, e.g., in intra- or inter-coding modes. Video data memory 71 and reference frame memory 82 may be formed by any of a variety of memory devices, such as DRAM, including SDRAM, MRAM, RRAM, or other types of memory devices. Video data memory 71 and reference frame memory 82 may be provided by the same memory device or separate memory devices. In various examples, video data memory 71 may be on-chip with other components of video decoder 30, or off-chip relative to those components.

Entropy decoding unit 70 or another coding unit may be configured to use an inverse of the modified mapping described above, e.g., for quantization matrix values or other values, such as video data, using a modified mapping of source symbols. In particular, entropy decoding unit 70 may apply a process that is generally inverse to the process used by the encoder. Entropy decoding unit 70 performs an entropy decoding process on the encoded bitstream to retrieve a one-dimensional array of transform coefficients. Entropy decoding process used depends on the entropy coding used by the video encoder 20 (e.g., CABAC, PIPE, or other processes described above). In accordance with the techniques described in this disclosure, entropy decoding unit 70 may apply a BAC process, e.g., within a CABAC process, as described in this disclosure. The entropy coding process used by the encoder may be signaled in the encoded bitstream or may be a predetermined process. For example, entropy decoding unit 70 may be configured to initialize a respective probability state for each bin of a plurality of bins for one or more syntax elements based on a comparison of a parameter associated with the coded unit and a respective threshold of a plurality of thresholds and perform inverse binary arithmetic coding on the encoded representations of the one or more syntax elements to obtain each bin of the plurality of bins using a respective probability state for the bin.

Figure 8:
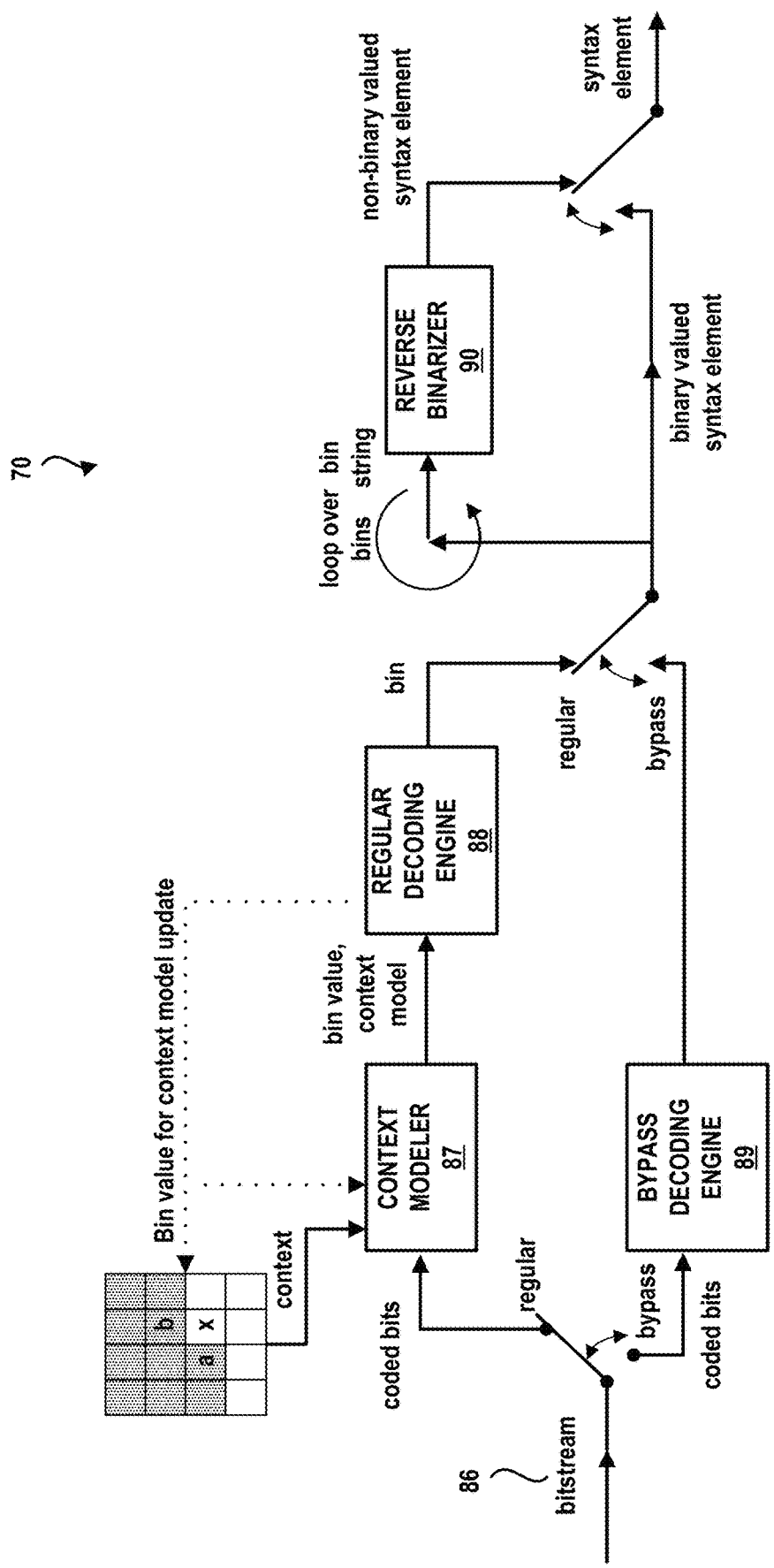
FIG. 8 is a block diagram illustrating a context adaptive binary arithmetic coder in a video decoder.

FIG. 8 is a block diagram of an example entropy encoding unit 70 that may be configured to perform CABAC in accordance with the techniques of this disclosure. Entropy decoding unit 70 of FIG. 8 performs CABAC in an inverse manner as that of entropy encoding unit 56 described in FIG. 6. Coded bits from bitstream 86 are input into entropy decoding unit 70. The coded bits are fed to either context modeler 87 or bypass coding engine 89 based on whether or not they were entropy coded using bypass mode or regular mode. If the coded bits were coded in bypass mode, bypass decoding engine will use Golomb-Rice or exponential Golomb decoding, for example, to retrieve the binary-valued syntax elements or bins of non-binary syntax elements.

If the coded bits were coded in regular mode, context modeler 87 may determine a probability model for the coded bits and regular decoding engine 88 may decode the coded bits to produce bins of non-binary valued syntax elements (or the one or more syntax elements themselves if binary-valued). After the context model and probability state σ is determined by context modeler 87, regular decoding engine 88 performs BAC on the bin value.

After the bins are decoded by regular decoding engine 88, a reverse binarizer 90 may perform a reverse mapping to convert the bins back into the values of the non-binary valued syntax elements.

Returning to FIG. 7, in some examples, entropy decoding unit 70 (or inverse quantization unit 76) may scan the received values using a scan mirroring the scanning mode used by entropy encoding unit 56 (or quantization unit 54) of video encoder 20. Although the scanning of coefficients may be performed in inverse quantization unit 76, scanning will be described for purposes of illustration as being performed by entropy decoding unit 70. In addition, although shown as separate functional units for ease of illustration, the structure and functionality of entropy decoding unit 70, inverse quantization unit 76, and other units of video decoder 30 may be highly integrated with one another.

Inverse quantization unit 76 inverse quantizes, i.e., de-quantizes, the quantized transform coefficients provided in the video bitstream and decoded by entropy decoding unit 70. The inverse quantization process may include a conventional process, e.g., similar to the processes proposed for HEVC, defined by the H.264 decoding standard, defined by the VVC standard, or defined by another decoding standard. The inverse quantization process may include use of a quantization parameter QP calculated by video encoder 20 for the CU to determine a degree of quantization and, likewise, a degree of inverse quantization that should be applied. Inverse quantization unit 76 may inverse quantize the transform coefficients either before or after the coefficients are converted from a one-dimensional array to a two-dimensional array.

Inverse transform processing unit 78 applies an inverse transform to the inverse quantized transform coefficients. In some examples, inverse transform processing unit 78 may determine an inverse transform based on signaling from video encoder 20, or by inferring the transform from one or more coding characteristics such as block size, coding mode, or the like. In some examples, inverse transform processing unit 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, the inverse transform processing unit 78 may apply a cascaded inverse transform, in which inverse transform processing unit 78 applies two or more inverse transforms to the transform coefficients of the current block being decoded.

Intra-prediction processing unit 74 may generate prediction data for a current block of a current frame based on a signaled intra-prediction mode and data from previously decoded blocks of the current frame.

Based on the retrieved motion prediction direction, reference frame index, and calculated current motion vector (e.g., a motion vector copied from a neighboring block according to a merge mode), motion compensation unit 72 produces a motion compensated block for the current portion. These motion compensated blocks essentially recreate the predictive block used to produce the residual data.

Motion compensation unit 72 may produce the motion compensated blocks, possibly performing interpolation based on interpolation filters. Identifiers for interpolation filters to be used for motion estimation with sub-pixel precision may be included in the one or more syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Additionally, motion compensation unit 72 and intra-prediction processing unit 74, in an HEVC example, may use some of the syntax information (e.g., provided by a quadtree) to determine sizes of LCUs used to encode frame(s) of the encoded video sequence. Although the foregoing was an example using HEVC, other examples may use other standards, for example, but not limited to the VVC standard.

Motion compensation unit 72 and intra-prediction processing unit 74 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

Summer 80 combines the residual blocks with the corresponding prediction blocks generated by motion compensation unit 72 or intra-prediction processing unit 74 to form decoded blocks. If desired, a deblocking filter may also be applied to filter the decoded blocks in order to remove blockiness artifacts. The decoded video blocks are then stored in reference frame memory 82, which provides reference blocks for subsequent motion compensation and also produces decoded video for presentation on a display device (such as the display device 32 of FIG. 1).

Arithmetic coding (AC) is a tool that may be used in data compression. Examples of data compression techniques may be found in I. H. Witten, R. M. Neal, and J. G. Cleary, "Arithmetic coding for data compression," *Commun. ACM*, vol. 30, no. 6, pp. 520-540, June 1987, A. Said, "Arithmetic Coding," in *Lossless Compression Handbook*, K. Sayood, Ed., Academic Press, chapter 5, pp. 101-152, 2003, and A. Said, "Introduction to arithmetic coding—theory and practice," Hewlett Packard Laboratories, Palo Alto, Calif., USA, Technical Report HPL-2004-76, April 2004, (http://www.hpl.hp.com/techreports/2004/HPL-2004-76.pdf).

While AC was optional in the AVC/H.264 (see I. D. Marpe, H. Schwarz, and T. Wiegand, "Context-based adaptive binary arithmetic coding in the H.264/AVC video compression standard," *IEEE Trans. Circuits Syst. Video Technol.*, vol. 13, no. 7, pp. 620-636, July 2003 and I. E. Richardson, *The H.264 Advanced Video Compression Standard*, $2^{nd}$ ed., John Wiley and Sons Ltd., 2010) video compression standard, AC became the only entropy coding technique of video coding standards HEVC/H.265 (see V. Sze and M. Budagavi, "High throughput CABAC entropy coding in HEVC," *IEEE Trans. Circuits Syst. Video Technol.*, vol. 22, no. 12, pp. 1778-1791, December 2012, V. Sze and D. Marpe, "Entropy coding in HEVC," in High Efficiency Video Coding (HEVC): Algorithms and Architectures, V. Sze, M. Budagavi, and G. J. Sullivan, Eds., chapter 8, pp. 209-274. Springer, 2014, M. Wien, *High Efficiency Video Coding: Coding Tools and Specification*, Springer-Verlag, 2015) and VP9 (see D. Mukherjee, J. Bankoski, R. S. Bultje, A. Grange, J. Han, J. Koleszar, P. Wilkins, and Y. Xu, "The latest open-source video codec VP9—an overview and preliminary results," in *Proc. 30th Picture Coding Symp.*, San Jose, Calif., December 2013).

One problem of using entropy coding in practical compression applications is that techniques may be optimized for stationary data sources, yet in practice, real data (e.g., image/video data) are far from being stationary. Some solutions use data classification and adaptive coding methods to address this problem. One goal of the techniques described in this disclosure is to increase the coding efficiency with initialization techniques for adaptive probability estimation techniques in AC-based codecs/standards.

Techniques described herein, may be used in conjunctions with one or more of the techniques described in U.S. Provisional Application No. 62/168,571, filed May 29, 2015, U.S. Patent Publication No. 2016/0353113, published on Dec. 1, 2016, U.S. Patent Publication No. 2016/0353111, published on Dec. 1, 2016, U.S. Patent Publication No. 2016/0353112, published on Dec. 1, 2016, and U.S. Provisional Application No. 62/588,867, filed Nov. 20, 2017, the entire contents of each of which are hereby incorporated by reference (hereinafter, the foregoing applications are collectively referred to as "set of fixed initialization applications"). The techniques of this disclosure include techniques for the initialization of probability states by introducing a new signaling scheme that allows an encoder/decoder (e.g., video encoder 20 and video decoder 30) to determine a set (e.g., a set that meets some predetermined rate-distortion criteria or some other criteria) of probability initializations among multiple candidates. Also, this disclosure describes one or more techniques for per-context probability initialization. The disclosed techniques may provide more flexible probability state initialization compared to one or more of the techniques described in the set of fixed initialization applications.

Some example modern video coding standards adopt the strategy of decomposing entropy coding into modeling and actual coding (see. H. Witten, R. M. Neal, and J. G. Cleary, "Arithmetic coding for data compression," *Commun. ACM*, vol. 30, no. 6, pp. 520-540, June 1987, A. Said, "Arithmetic Coding," in *Lossless Compression Handbook*, K. Sayood, Ed., Academic Press, chapter 5, pp. 101-152, 2003, and A. Said, "Introduction to arithmetic coding—theory and practice," Hewlett Packard Laboratories, Palo Alto, Calif., USA, Technical Report HPL-2004-76, April 2004, (http://www.hpl.hp.com/techreports/2004/HPL-2004-76.pdf). Thus, the binary arithmetic coding process used in modern video compression standards may be divided into three main stages: binarization, probability estimation, and arithmetic coding.

Figure 9:
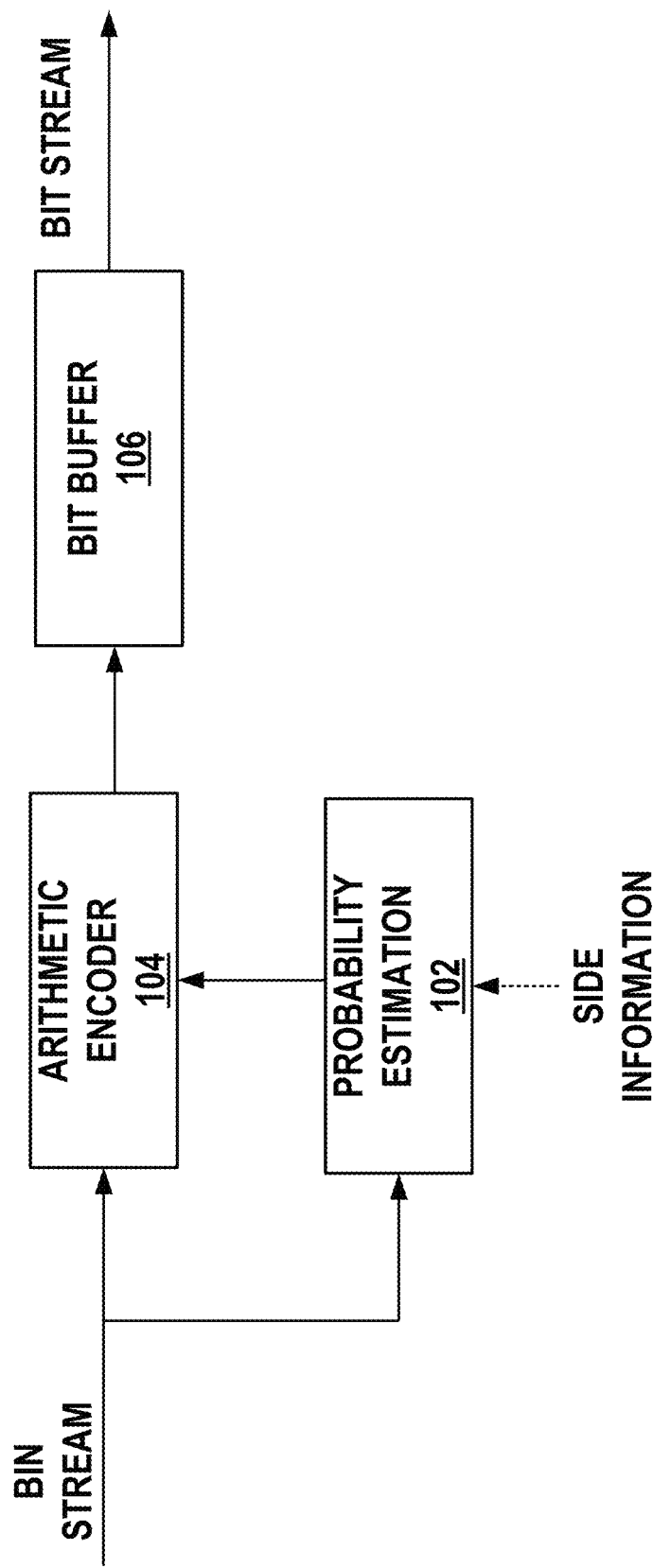
FIG. 9 is a block diagram illustrating a first example encoder architecture for entropy coding.

FIG. 9 is a block diagram illustrating a first example encoder architecture for entropy coding. In the example of FIG. 9, a binarizer (e.g., binarizer 66) performs binarization to generate bin stream. For example, the binarizer decomposes each data element (or syntax element) to be coded into a sequence of binary data symbols (bins). Because binary symbol probabilities depend on the data element and binary symbol position in its decomposition, the binarizer may assign a bin context (or simply context) for each type of binary symbol, uniquely identifying the probability estimate to be used for its entropy coding.

Because all bins assigned to a given context have similar, but not exactly equal probabilities, probability estimation 102 updates probability estimates based on the bin values that have been previously encoded and side information, which may include a parameter associated with a coded unit. Arithmetic encoder 104 entropy encodes a value for each binary symbol (0 or 1) using a respective estimated probability, which is defined by the bin's corresponding context. Bit buffer 106 buffers the output of arithmetic encoder 104 and outputs a bit stream.

Figure 10:
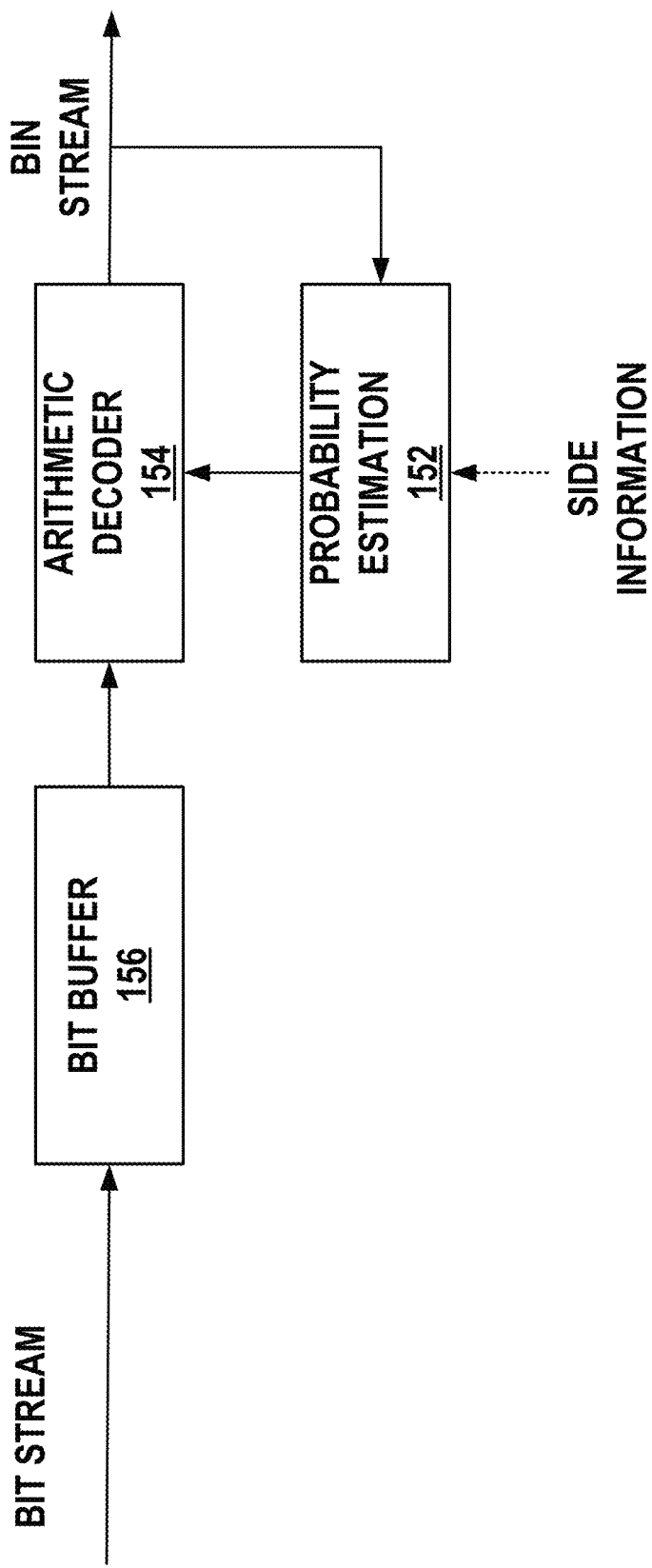
FIG. 10 is a block diagram illustrating a first example decoder architecture for entropy coding.

FIG. 10 is a block diagram illustrating a first example decoder architecture for entropy coding. In the example of FIG. 10, bit buffer 156 buffers a bit stream. Arithmetic decoder 154 entropy decodes a value for each binary symbol (0 or 1) using a respective estimated probability, which is defined by the bin's corresponding context. Because all bins assigned to a given context have similar, but not exactly equal probabilities, probability estimation 152 updates probability estimates based on the bin values that have been previously decoded and side information.

Figure 11:
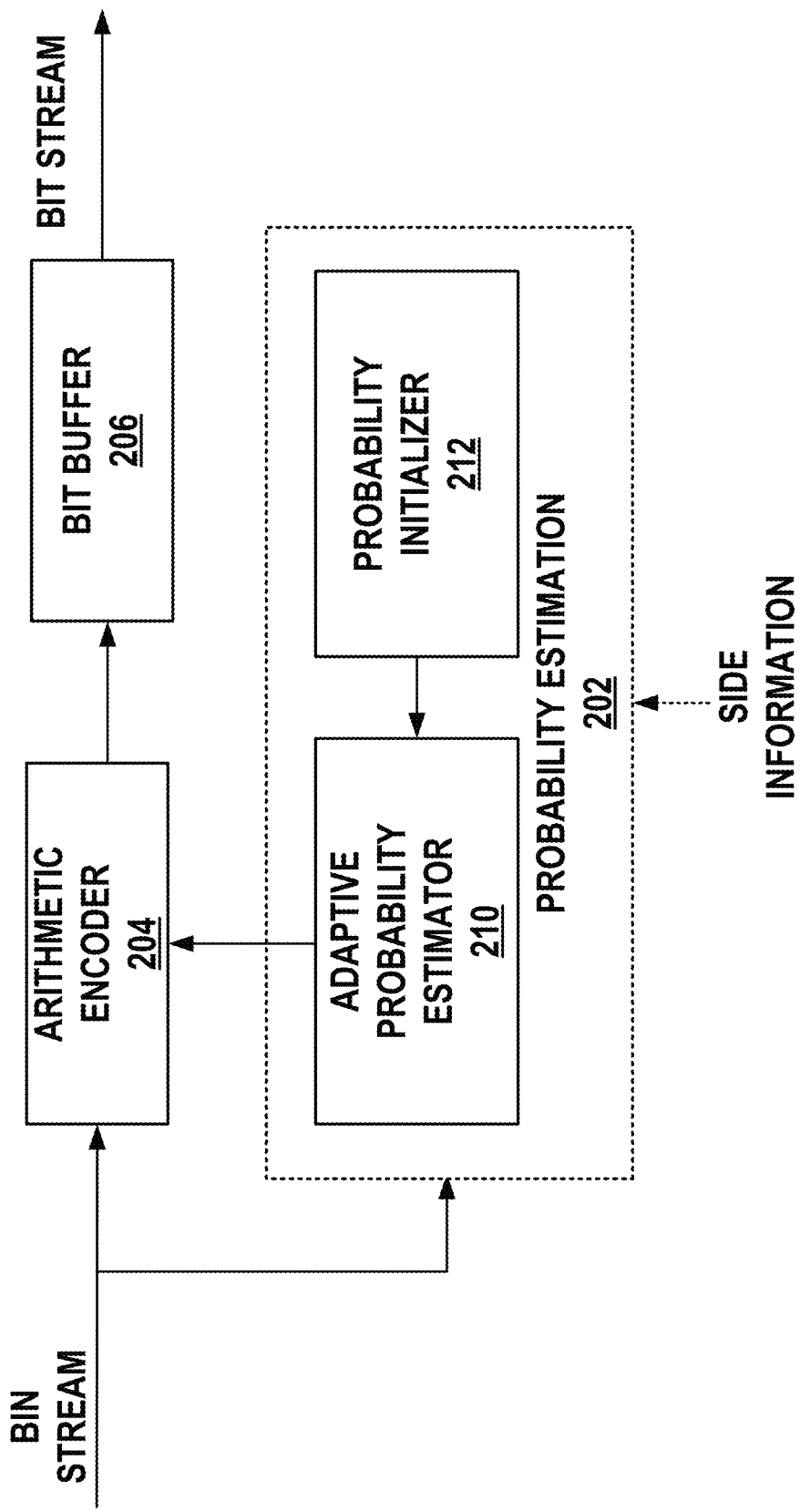
FIG. 11 is a block diagram illustrating a second example encoder architecture for entropy coding.

This disclosure may describe techniques to increase compression by improving the probability initializations for the probability estimation stage. FIGS. 11 and 11 illustrate techniques as an extension to the encoder/decoder architecture depicted in FIGS. 9 and 10. Video encoder 20 (e.g., entropy encoding unit 56) may perform the techniques illustrated in example FIG. 11. In some examples, binarizer 66, context modeler 67, regular encoding engine 68, and bypass encoding engine 69 may perform the techniques illustrated in example FIG. 11. Similarly, video decoder 30 (e.g., entropy decoding unit 70) may perform the techniques illustrated in example FIG. 12. In some examples, context modeler 87, regular decoding engine 88, bypass decoding engine 89, and reverse binarizer 90 may perform the techniques illustrated in example FIG. 12.

FIG. 11 is a block diagram illustrating a second example encoder architecture for entropy coding. In the example of FIG. 11, a binarizer (e.g., binarizer 66) performs binarization to generate bin stream. Probability estimation 202 updates probability estimates based on the bin values that have been previously encoded and side information. As shown, probability estimation 202 includes probability initializer 212 and adaptive probability estimator 210. Probability initializer 212 may determine a threshold from a plurality of thresholds for creating multiple sets of probability states using side information (e.g., an explicit signaling of the threshold, implicit signaling, etc.). Adaptive probability estimator 210 may update the probability estimates based on the bin values that have been previously encoded and the side information. Said differently, for example, adaptive probability estimator 210 may apply adaptive probability estimation using a parameter associated with a coded unit to update the respective probability state for the bin. Arithmetic encoder 204 entropy encodes a value for each binary symbol (0 or 1) using a respective estimated probability, which is defined by the bin's corresponding context. Bit buffer 206 buffers the output of arithmetic encoder 104 and outputs a bit stream.

Figure 12:
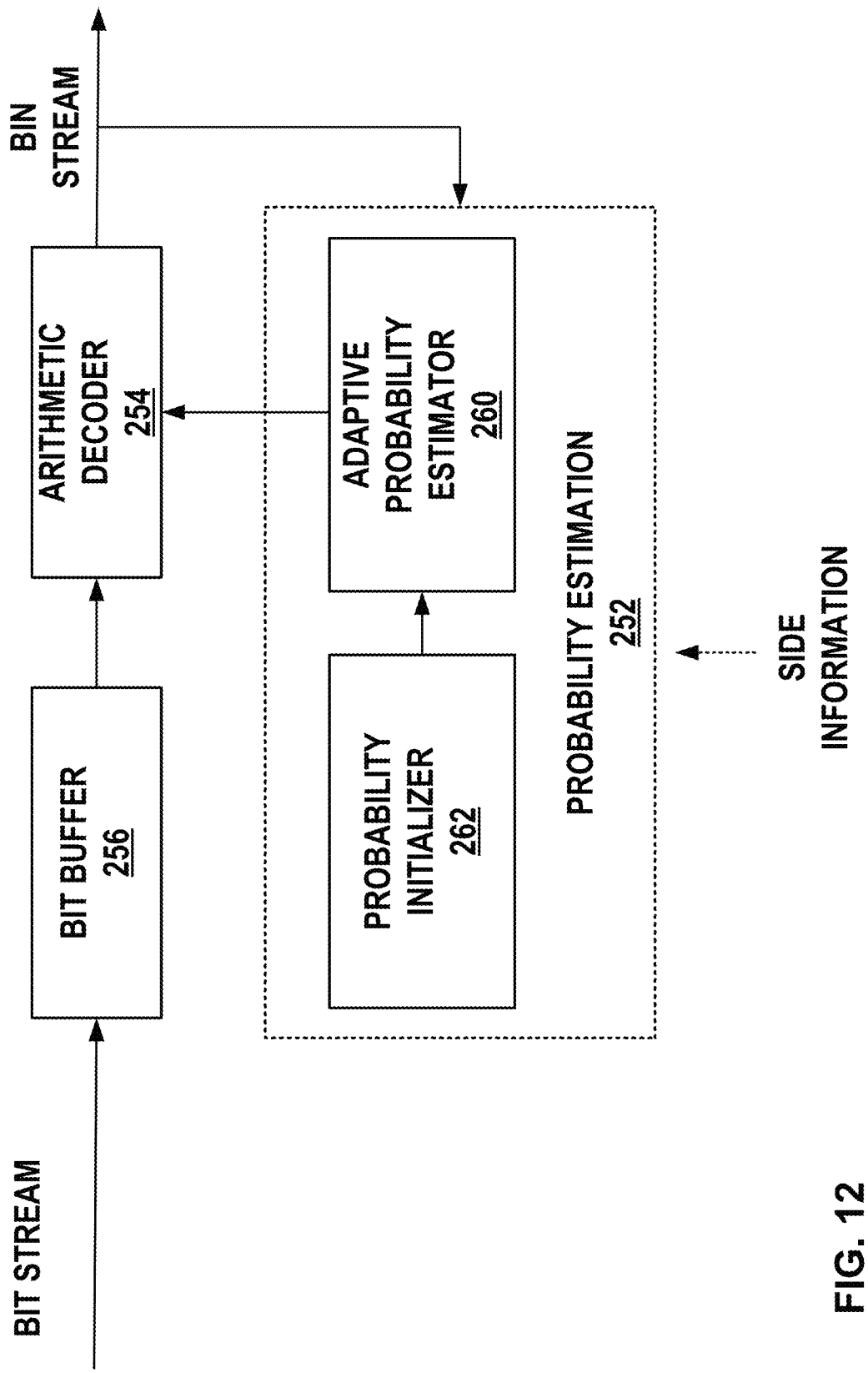
FIG. 12 is a block diagram illustrating a second example decoder architecture for entropy coding.

FIG. 12 is a block diagram illustrating a second example decoder architecture for entropy coding. In the example of FIG. 12, bit buffer 256 buffers a bit stream. Arithmetic decoder 254 entropy decodes a value for each binary symbol (0 or 1) using a respective estimated probability, which is defined by the bin's corresponding context. Probability estimation 252 updates probability estimates based on the bin values that have been previously decoded and side information. As shown, probability estimation 252 includes probability initializer 262 and adaptive probability estimator 260. Probability initializer 262 may determine a threshold from a plurality of thresholds for creating multiple sets of probability states using side information (e.g., an explicit signaling of the threshold, implicit signaling, etc.). Adaptive probability estimator 260 may update the probability estimates based on the bin values that have been previously encoded and the side information. Said differently, for example, adaptive probability estimator 260 may apply adaptive probability estimation using a parameter associated with the coded unit to update the respective probability state for the bin.

Figure 13:
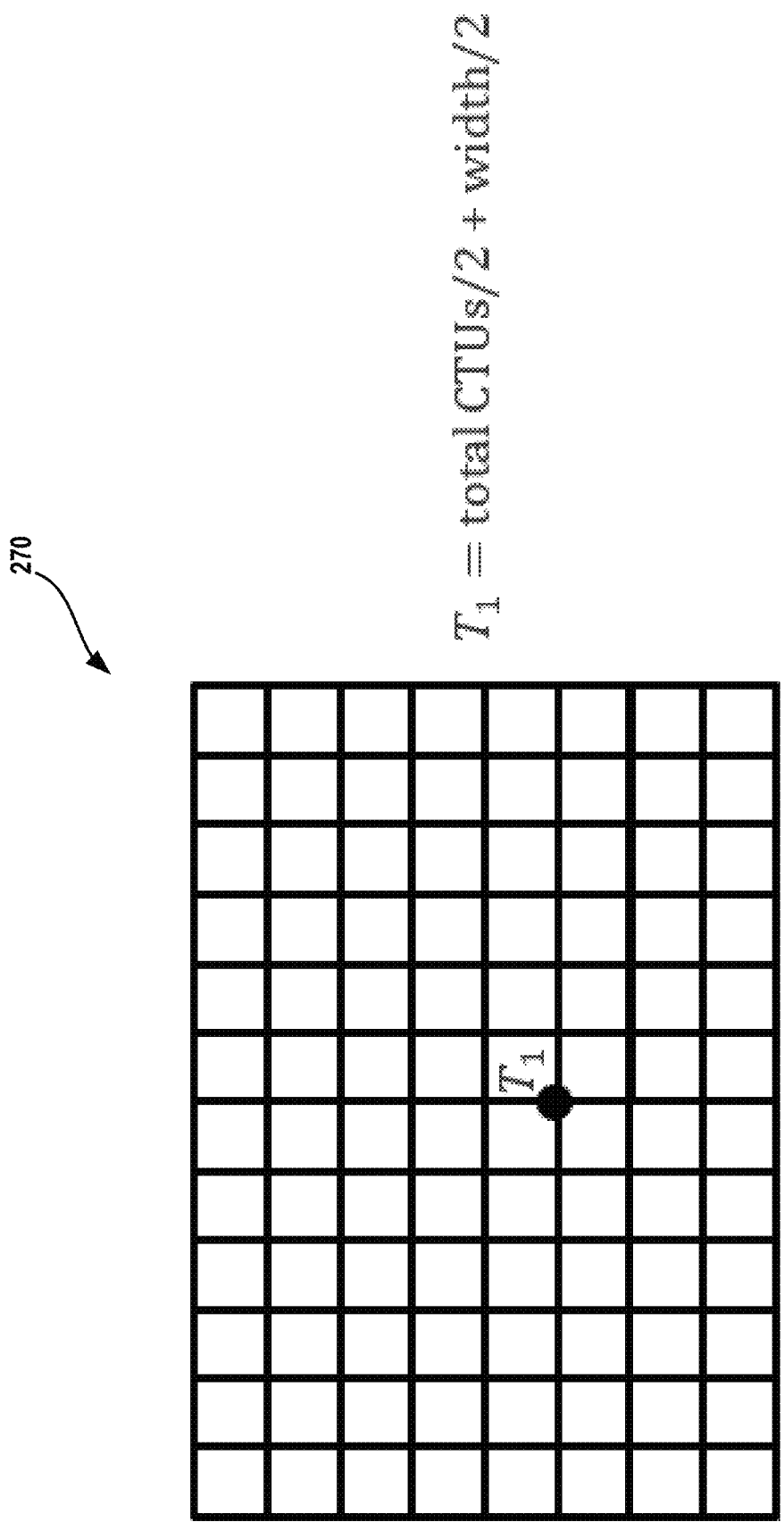
FIG. 13 is a conceptual diagram illustrating a location-based threshold near a middle of a video slice composed of blocks called coding tree units (CTUs).

In general, some example techniques use a fixed location-based threshold (as shown in FIG. 13). For example, probability estimation 102 and/or probability estimation 152 may store a current probability states for a current slice as an initial probability state for a subsequent slice in response to coding (e.g., encoding, decoding, etc.) a block at a pre-defined location-based threshold $T_1$ of a slice 270. For instance, a video coder may save the probability states (e.g., exact probability measures or corresponding parameters), and use the saved states as initial probabilities for encoding/decoding subsequent video slices (e.g., a set of blocks). By doing this, the video coder may code the subsequent slices more efficiently because the probability states are updated based on a more recent set of states instead of a default (e.g., fixed) initialization made in the beginning of encoding/decoding process.

Figure 14:
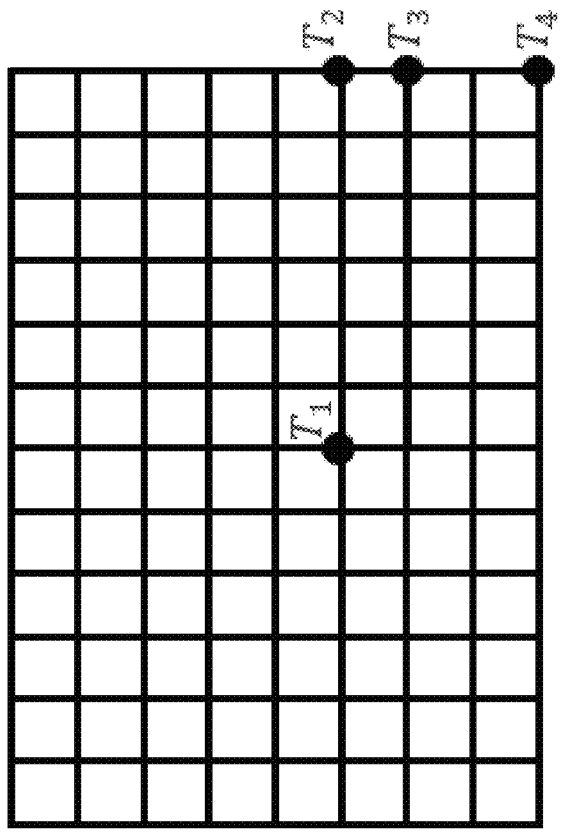
FIG. 14 is a conceptual diagram illustrating multiple location-based thresholds pre-defined at four different locations.

One or more of the techniques in the set of fixed initialization applications may allow to exploit dependencies between blocks more adaptively, for example, by using multiple thresholds for creating multiple sets of probability states. In the example of FIG. 14, probability estimation 102 and/or probability estimation 152 may store a current probability state for a current slice as an initial probability state for a subsequent slice in response to coding a block at each pre-defined location-based thresholds $T_1$, $T_2$, $T_3$, and $T_4$ of a slice 272. While the example of FIG. 14 uses location-based thresholds $T_1$, $T_2$, $T_3$, and $T_4$, some examples may use a combination of one or more location-based thresholds and one or more counter-based thresholds, or only one or more counter-based thresholds. As used herein, counter-based thresholds may refer to a threshold that indicates a count (e.g., a number of blocks coded). In contrast, however, location-based thresholds may refer to a threshold that indicates a particular location within a portion of a picture (e.g., a particular block position within a slice).

A video coder (e.g., video encoder 20 and/or video decoder 30) may be configured to select among multiple thresholds for creating multiple sets of probability states to be used for encoding/decoding (e.g., probability estimation). Said differently, for example, video decoder 30 may determine a threshold from a plurality of thresholds for creating multiple sets of probability states to be used for probability estimation for a bin of the plurality of bins and inverse binary arithmetic code the encoded representations of the one or more syntax elements to obtain the bin using a probability state corresponding to the threshold. In another example, video encoder 20 may determine a threshold from a plurality of thresholds for creating multiple sets of probability states to be used for probability estimation for a bin of the plurality of bins and binary arithmetic code the bin to obtain the encoded representations of the one or more syntax elements using a probability state corresponding to the threshold. For this purpose, video encoder 20 and video decoder 30 may be configured to operate according to a predefined signaling technique. For example, video encoder 20 and video decoder 30 may be configured for a rate-distortion optimized selection scheme that significantly improves the probability estimation and coding efficiency.

Video encoder 20 and video decoder 30 may be configured to define a more general notion of thresholding, which is not only based on location (e.g., location-based threshold). Video encoder 20 and video decoder 30 may be configured for a counter-based thresholding technique, where, for example, video encoder 20 and video decoder 30 may be configured to use multiple pre-defined thresholds to allow adaptation on a per-context basis. The above-discussed previous techniques for arithmetic coding do not consider per context adaptation and only use location information for initialization of the probability states.

Video encoder 20 and video decoder 30 may be configured for probability initialization in arithmetic coding, which may provide a better adaptation for probability estimates and improve coding efficiency compared to video encoders and video decoders that do not consider per context adaptation and only use location information for initialization of the probability states. Video encoder 20 and video decoder 30 may be configured to apply probability initialization in arithmetic coding to CABAC, which is a widely used example of arithmetic coding.

Video encoder 20 and video decoder 30 may be configured for selective probability initialization using previously coded picture information, where, for example, video encoder 20 and video decoder 30 may initialize the current/future picture contexts from the probability states or symbol probabilities of the previously coded pictures obtained at different levels of encoding/decoding progress. For example, video decoder 30 may perform selective probability initialization using previously coded picture information and initialize a plurality of thresholds from probability states or symbol probabilities of the previously coded picture information obtained at different levels of decoding progress. Similarly, video encoder 20 may perform selective probability initialization using previously coded picture information and initialize a plurality of thresholds from probability states or symbol probabilities of the previously coded picture information obtained at different levels of encoding progress.

Video encoder 20 and video decoder 30 may be configured to determine a measure of progress (i.e., the choice of metrics) in terms of locations (e.g., coordinates) in a frame or number of coded pixels/blocks, and/or to determine different levels of progression based on a threshold or a set of thresholds. As a special case of this invention, video encoder 20 and video decoder 30 may be configured for one or more techniques of the set of fixed initialization applications that use a single fixed location (see in FIG. 13) as the threshold (e.g., a single location-based threshold) to determine the progress. When the encoding and/or decoding process reaches to the threshold, video encoder 20 and video decoder 30 may be configured to save the probability states and to use the saved probability states for initialization in the future.

A general thresholding is discussed in the following. Instead of using a single location-based threshold, video encoder 20 and video decoder 30 may be configured to use multiple thresholds (e.g., including but not limited to a threshold-based threshold on location) may be used for per-context adaptation.

Assuming there are M contexts $c_1, c_2, \ldots c_M$, M (M is greater than 1), video encoder 20 and video decoder 30 may be configured to define different counters and associated N different threshold values $T_1, T_2, \ldots T_N$ for contexts to determine when to store corresponding (per-context) probability states that may be used in probability estimation or probability initialization for encoding/decoding subsequent video pictures/slices/tiles/wavefronts as initial states. Additionally, or alternatively, the number N may be adaptive and be different for different contexts. In this case, N may be equal to 0 for certain context. Additionally, or alternatively, the threshold values may be the same for all contexts, or be adaptive per context groups (in one example, such as group #1: context used for mode coding, group #2: luma transform coefficient coding; group #3: chroma transform coefficient coding . . . ), or be adaptive per context. Said differently, for example, video encoder 20 and video decoder 30 may be configured to determine a pre-defined plurality of thresholds for the per-context adaption is associated with a group corresponding to one of a context used for mode coding, a luma transform coefficient coding, a chroma transform coefficient coding, or an adaptive per context.

Video encoder 20 and video decoder 30 may be configured for selective initialization that is context specific. Said differently for example, video encoder 20 and video decoder 30 may be configured to determine a plurality of thresholds as a pre-defined plurality of thresholds for per-context adaption. In some examples, video encoder 20 and video decoder 30 may be configured to, for different contexts, derive the probability states at different locations in the previous pictures. For example, video encoder 20 and video decoder 30 may be configured to determine the pre-defined plurality of thresholds for the per-context adaption to have a number of thresholds that is different than a number of thresholds for another pre-defined plurality of thresholds for another per-context adaption.

Video encoder 20 and video decoder 30 may be configured to define the threshold values based on the information available in video encoder 20 and/or video decoder 30. Examples of the information available in video encoder 20 and/or video decoder 30 may include, but are not limited to, (i) number of encoded/decoded bits, (ii) number of encoded/decoded bins (iii) number of pixels processed (iv) number of block segments (v) video/image/slice resolutions. Video encoder 20 and video decoder 30 may be configured to apply one or more of the above-mentioned examples.

Video encoder 20 and video decoder 30 may be configured to assign different counters and associated threshold values not only for each context but also other information (e.g., side information as shown in FIGS. 9 and 10) such as, but not limited to, a quantization parameter (QP), a slice type, a high-level syntax, etc. For example, video encoder 20 and video decoder 30 may be configured to initialize a respective probability state for each bin of a plurality of bins for the one or more syntax elements based on a comparison of a parameter associated with the coded unit and a respective threshold of a plurality of thresholds. As used herein, a parameter associated with a slice may include, but is not limited to, side information (e.g., a QP, slice type, a high-level syntax, etc.), or other parameters associated with a slice.

Video encoder 20 and video decoder 30 may be configured to assess, in implicit derivation, certain information to determine whether the probability state of a certain context or contexts from the previous pictures is used as probability initialization in the current picture. For example, video encoder 20 and video decoder 30 may be configured to count the number of bins processed using a context or group of contexts, and, if the number of processed bins reaches a certain value or exceeding it, video encoder 20 and video decoder 30 may be configured to use the probability state of that contexts as initialization. In some examples, video encoder 20 and video decoder 30 may be configured to initializing in response to determining a count of a number of bins processed using the context exceeds a minimum value.

Video encoder 20 and video decoder 30 may be configured to use one or more techniques described herein for certain slices, such as B-slice and P-slice, to exploit temporal redundancies.

Threshold value for each context (i.e., $T_i$ for each $c_i$ for i=1, . . . , M) may be pre-defined. In this example, video encoder 20 and video decoder 30 may be configured to employ a counter for each context to determine when to store probability information (e.g., when a counter-based threshold value is achieved, the corresponding probability state is updated). For example, video encoder 20 and video decoder 30 may be configured to determine a count of a number of bins processed using context exceeds a minimum value.

Together with context-specific threshold, video encoder 20 and video decoder 30 may be configured to use a location-based thresholding such as in the set of fixed initialization applications to define more sophisticated rules/conditions to update probability initializations. For example, video encoder 20 may be configured to allow context-specific probability updates only when video encoder 20 reaches to a specified location in a frame. Similarly, in some examples, video decoder 30 may be configured to allow context-specific probability updates only when video decoder 30 reaches to a specified location in a frame.

Video encoder 20 and video decoder 30 may be configured to group the context according to a classification. For example, video encoder 20 and video decoder 30 may be configured to assign a single probability state to a group of contexts according to a classification. In some examples, video encoder 20 and video decoder 30 may be configured to derive the initialization probabilities for that group at the same previous picture threshold (e.g., location). The thresholds (locations) may be predetermined.

Video encoder 20 may be configured to explicitly signal the thresholds (location or locations) to the decoder side. In this example, video decoder 30 may be configured to receive the explicitly signaled thresholds. For instance, video decoder 30 may be configured to receive an explicit signaling of a respective threshold for one or more bins of a plurality of bins. In this example, video decoder 30 may be configured to determine a respective threshold for a bin of the plurality of bins using an explicit signaling of the respective threshold for the bin.

In some examples, video encoder 20 and video decoder 30 may be configured to implicitly derive the thresholds. For instance, video decoder 30 may be configured to determine an implicit signaling of the respective threshold for one or more bins of the plurality of bins. In one example, video encoder 20 and video decoder 30 may be configured to perform threshold (location) derivation that depends on slice type, hierarchical picture coding structure, group of pictures (GOP) size, and similar information.

In one example implementation, video encoder 20 and video decoder 30 may be configured to prestore the probability states at certain thresholds (locations) in the pictures. In this example, video encoder 20 and video decoder 30 may be configured to later use prestored states for probability initialization in the next pictures.

Signaling for multiple thresholds is discussed in the following. Among multiple threshold candidates, video encoder 20 and video decoder 30 may be configured to select the best threshold or the best set of thresholds. In this example, video encoder 20 may be configured to (explicitly) signal the best threshold or the best set of thresholds. For example, video encoder 20 may be configured to perform a rate-distortion (RD) optimization where, for example, video encoder 20 tries every possible threshold, selects the best threshold or the best set of thresholds based on an RD metric, and signals the best threshold or the best set of thresholds to video decoder 30. In some examples, video encoder 20 may use previously coded blocks and/or related information to select the best threshold or the best set of thresholds. Using previously coded blocks and/or related information to select the best threshold or the best set of thresholds may lead to savings in video encoder complexity (because the video encoder may not try all possible cases). It should be understood that video decoder 30 may be configured to use the signaled decision (by video encoder 20) for decoding. In some examples, video encoder 20 and video decoder 30 may be configured to select the best threshold or the best set of thresholds that result in an improved probability estimation and coding efficiency compared to encoding/decoding using other thresholds.

Video encoder 20 may explicitly signal a threshold or a set of thresholds (e.g., indexes associated with thresholds) for each context to the decoder in order to completely specify the probability initialization procedure.

Video encoder 20 may be configured to select thresholds via full-rate distortion optimization where all threshold candidates may be tested, and video encoder 20 may be configured to signal the best set of candidates.

To reduce the signaling overhead and/or simplify the rate distortion (RD) optimization, some set of thresholds may be pre-determined (i.e., fixed) while video encoder 20 may be configured to explicitly signal thresholds after the RD optimization. The choices of the pre-determined set of thresholds (and the set of thresholds to be signaled) may depend on the context and the video slice with specific side information (e.g., QP).

As an extension to the set of fixed initialization applications (e.g., instead of using a fixed location based threshold as in FIG. 13), video encoder 20 and video decoder 30 may be configured to perform RD optimized selection of multiple location-based thresholds to improve the coding efficiency by having a more flexible and adaptive coding. FIG. 14 illustrates an example of using multiple location-based thresholds, where among 4 candidates, video encoder 20 may be configured to send (e.g., implicitly or explicitly) a single location for each video slice, and video encoder 20 and video decoder 30 may be configured to use the probability states obtained at the threshold location as the initial probability states in the next video slice.

Video encoder 20 may be configured to explicitly signal the threshold(s) for certain slices (or tiles/pictures . . . ), while implicitly signaling remaining slices (or tiles/pictures . . . ), to reduce the signaling overhead. In one example, video encoder 20 may be configured to signal one threshold for the first slice within one picture and video encoder 20 and video decoder 30 may be configured to apply the same threshold to the remaining slices in the same picture. Similarly, video decoder 30 may be configured to determine an implicit signaling of the respective threshold for one or more bins of the plurality of bins for a coded unit using an explicit signaling for another coded unit. For instance, video decoder 30 may be configured to determine an implicit signaling of the respective threshold for one or more bins of a plurality of bins of a second slice of a picture using an explicit signaling for a first slice of the picture.

Figure 15:
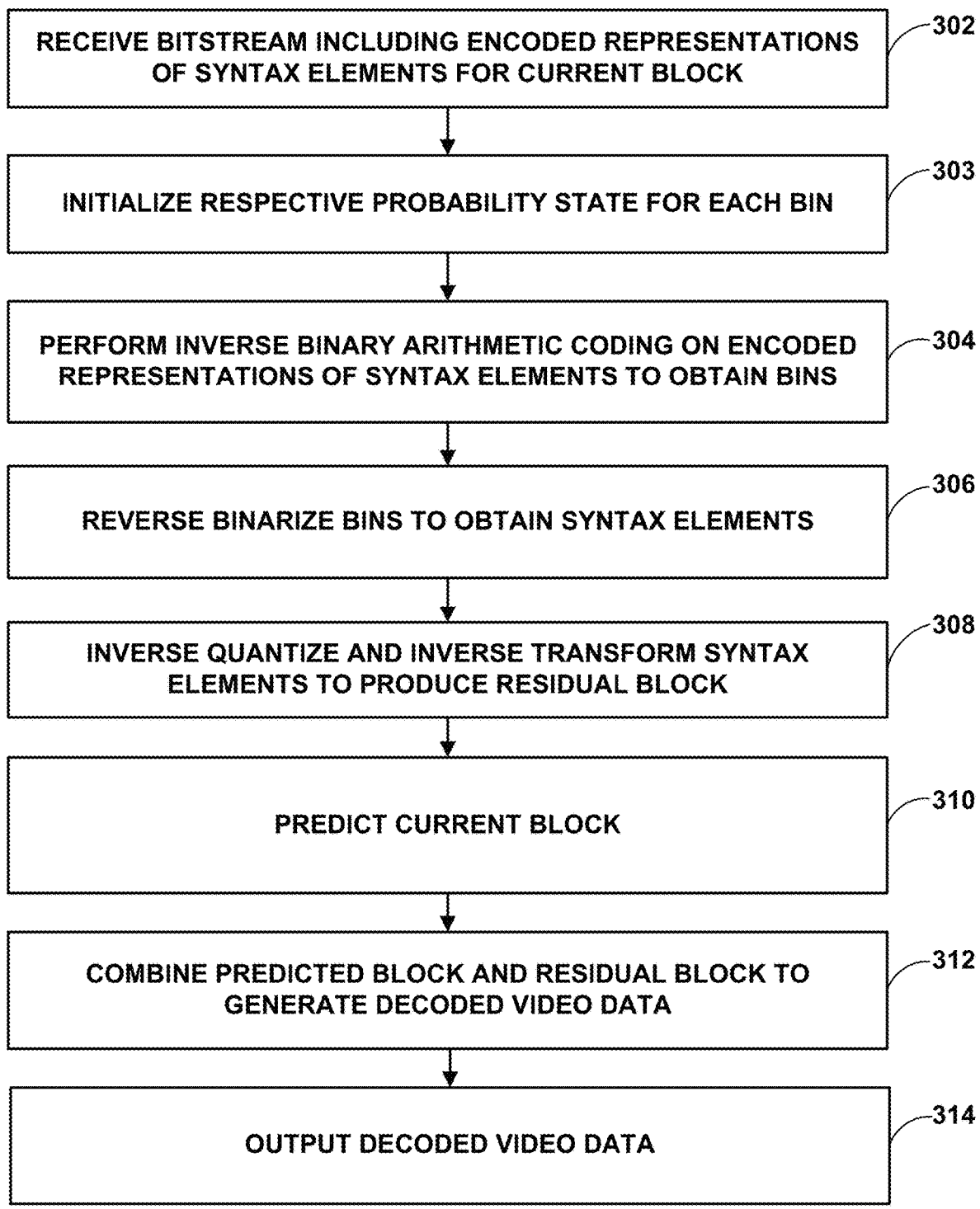
FIG. 15 is a flowchart illustrating techniques for decoding using thresholds for creating multiple sets of probability states.

FIG. 15 is a flowchart illustrating techniques for decoding using thresholds for creating multiple sets of probability states. The current block may include a current CU or a portion of the current CU. Although described with respect to video decoder 30, it should be understood that other devices may be configured to perform a method similar to that of FIG. 15.

In this example, video decoder 30 receives a video bitstream including encoded representations of one or more syntax elements for a current block (302). Video decoder 30 initializes a respective probability state for each bin (303). For example, video decoder 30 initializes a respective probability state for each bin of a plurality of bins for the one or more syntax elements based on a comparison of a parameter associated with the coded unit and a respective threshold of a plurality of thresholds. In some examples, video decoder 30 may determine a threshold from a plurality of thresholds for creating multiple sets of probability states to be used for probability estimation for a bin of the plurality of bins.

Video decoder 30 performs inverse binary arithmetic coding on the encoded representations of the one or more syntax elements to obtain bins (304). In this example, video decoder 30 inverse binary arithmetic codes the encoded representations of the one or more syntax elements to obtain each bin using a respective probability state for the bin. Video decoder 30 reverse binarizes the bins to obtain the one or more syntax elements (306).

Video decoder 30 inverse quantizes and inverse transforms the one or more syntax elements to produce a residual block (308). Video decoder 30 predicts the current block (310), e.g., using an intra- or inter-prediction mode to calculate a predicted block for the current block. Although FIG. 15 illustrates step 310 being performed after producing the residual block, in some examples, step 310 may be performed while producing the residual block (e.g., in parallel) or before producing the residual block. Video decoder 30 combines the predicted block and the residual block to generate decoded video data (312) and outputs the decoded video data (314).

Figure 16:
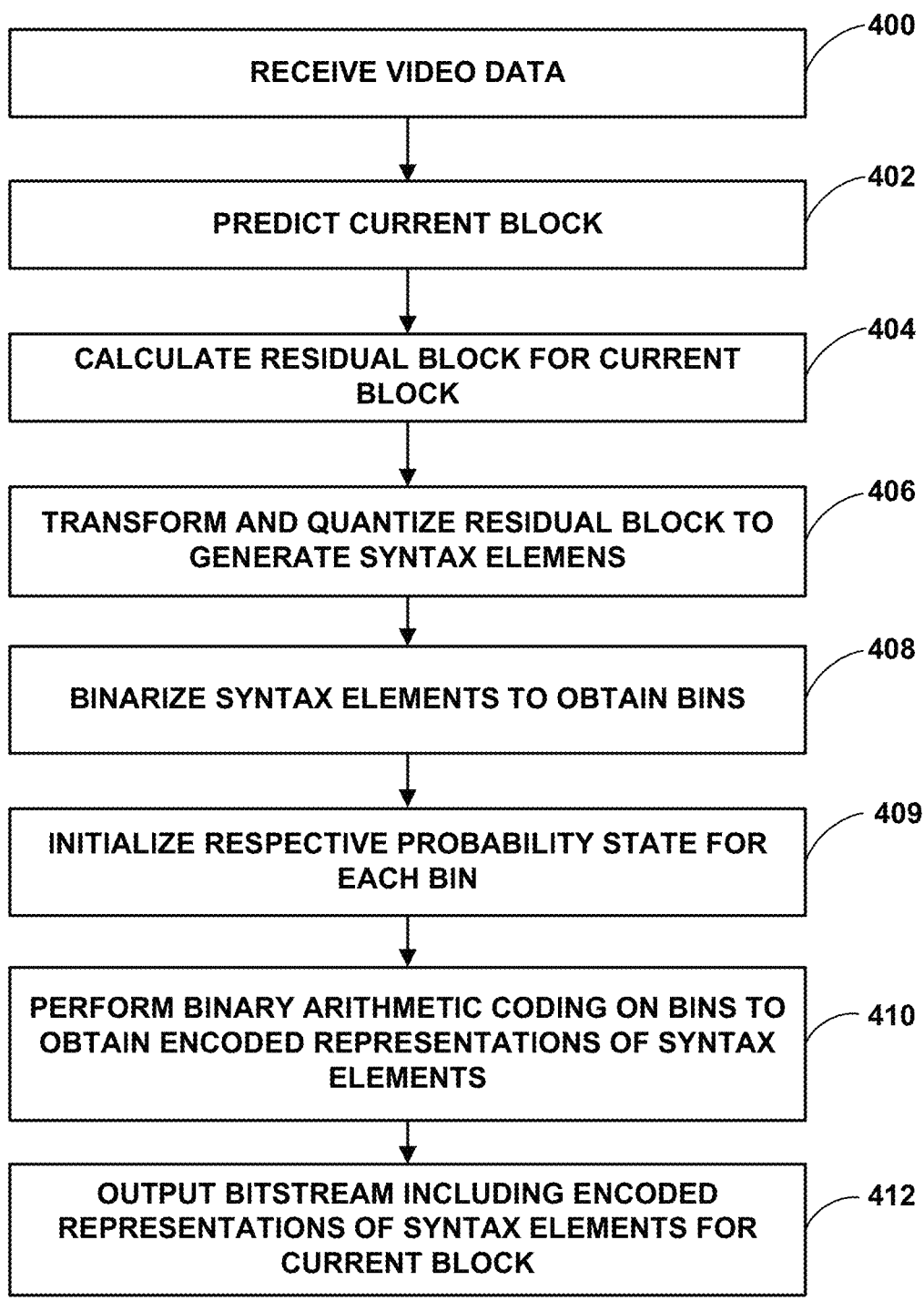
FIG. 16 is a flowchart illustrating techniques for encoding using thresholds for creating multiple sets of probability states.

FIG. 16 is a flowchart illustrating techniques for encoding using thresholds for creating multiple sets of probability states. The current block may include a current CU or a portion of the current CU. Although described with respect to video encoder 20, it should be understood that other devices may be configured to perform a method similar to that of FIG. 16.

In this example, video encoder 20 receives video data (e.g., blocks of video data) (400). Video encoder 20 predicts the current block (402), e.g., using an intra- or inter-prediction mode to calculate a predicted block for the current block. For example, video encoder 20 may calculate one or more prediction units (PUs) for the current block. Video encoder 20 may then calculate a residual block for the current block, e.g., to produce a transform unit (TU) (404). To calculate the residual block, video encoder 20 may calculate a difference between the original, uncoded block and the predicted block for the current block. Video encoder 20 transforms the residual block to produce transform coefficients, and quantize the transform coefficients of the residual block to generate syntax elements (406). Next, video encoder 20 binarizes the one or more syntax elements to obtain bins (408).

Video encoder 20 initializes a respective probability state for each bin (409). For example, video encoder 20 initializes a respective probability state for each bin of a plurality of bins for the one or more syntax elements based on a comparison of a parameter associated with the coded unit and a respective threshold of a plurality of thresholds. In some examples, video encoder 20 may determine a threshold from a plurality of thresholds for creating multiple sets of probability states to be used for probability estimation for a bin of the plurality of bins.

Video encoder 20 performs binary arithmetic coding on the bins to obtain encoded representations of the one or more syntax elements (410). For example, video encoder 20 binary arithmetic codes the bin to obtain the encoded representations of the one or more syntax elements using a respective probability state of the bin. Video encoder 20 outputs a video bitstream including the encoded representations of the one or more syntax elements for the current block (412).

Techniques described herein may improve an accuracy of a probability initialization for entropy coding, particularly CABAC. For example, by configuring a video decoder to initialize a respective probability state for each bin of a plurality of bins for one or more syntax elements based on a comparison of a parameter associated with the coded unit and a respective threshold of a plurality of thresholds and perform inverse binary arithmetic coding on the encoded representations of the one or more syntax elements to obtain each bin of the plurality of bins using a respective probability state for the bin, the video decoder may improve an accuracy of a probability initialization for entropy decoding. Similarly, a video encoder may be configured to initialize a respective probability state for each bin of a plurality of bins for the one or more syntax elements based on a comparison of a parameter associated with the coded unit and a respective threshold of a plurality of thresholds and perform binary arithmetic coding on the plurality of bins of the one or more syntax elements to obtain encoded representations of the one or more syntax elements using a respective probability state for the bin. In this way, a video coder may improve a compression rate of video data transmitted in a video bitstream, which may improve a processing performance of the video coder and/or reduce a power usage by the video coder.

In one example of the disclosure, video decoder 30 may be part of an apparatus that further includes a display configured to display the decoded video data. In another example of the disclosure, video encoder 20 may be part of an apparatus that is a wireless communication device further comprising a receiver configured to receive the video data. In one example, the wireless communication device is a cellular telephone and the video data is received by the receiver and modulated (and demodulated) according to a cellular communication standard or wireless communication protocol.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    receiving, by processing circuitry, a video bitstream including encoded representations of one or more syntax elements of a coded unit;
    determining, by the processing circuitry, a respective threshold of a plurality of thresholds for each bin of a plurality of bins for the one or more syntax elements based on one or more of a quantization parameter (QP), a slice type, or a high-level syntax;
    initializing, by the processing circuitry, a respective probability state for each bin of the plurality of bins for the one or more syntax elements based on a comparison of a parameter associated with the coded unit and the respective threshold of the plurality of thresholds;
    performing, by the processing circuitry, inverse binary arithmetic coding on the encoded representations of the one or more syntax elements to obtain each bin of the plurality of bins using a respective probability state for the bin;
    inverse binarizing, by the processing circuitry, the plurality of bins to obtain the one or more syntax elements; and
    decoding, by the processing circuitry, the video data based on the one or more syntax elements.

2. The method of claim 1, wherein the video data is for current picture information and wherein the initializing comprises:
    performing selective probability initialization using previously coded picture information, wherein the plurality of thresholds is initialized from probability states or symbol probabilities of the previously coded picture information obtained at different levels of decoding progress.

3. The method of claim 1, wherein the plurality of thresholds is a pre-defined plurality of thresholds for per-context adaption.

4. The method of claim 3, wherein the pre-defined plurality of thresholds for the per-context adaption has a number of thresholds that is different than a number of thresholds for another pre-defined plurality of thresholds for another per-context adaption.

5. The method of claim 3, wherein the pre-defined plurality of thresholds for the per-context adaption is associated with a group, the group corresponding to one of a context used for mode coding, a luma transform coefficient coding, a chroma transform coefficient coding, or an adaptive per context.

6. The method of claim 1, further comprising:
    determining, by the processing circuitry, a respective counter for each bin of the plurality of bins based on one or more of the QP, the slice type, or the high-level syntax,
    wherein the initializing is based a comparison of the respective threshold for each bin of the plurality of bins and the respective counter for each bin of the plurality of bins.

7. The method of claim 1, wherein a context is assigned to each bin, wherein the context includes the respective probability state, and wherein the initializing is in response to determining, by the processing circuitry, a count of a number of bins processed using the context exceeds a minimum value.

8. The method of claim 1, wherein decoding the video data comprises decoding one or more of a B-slice or P-slice and wherein the coded unit comprises a slice, picture, or a largest coding unit (LCU).

9. The method of claim 1, wherein the plurality of thresholds is counter-based.

10. The method of claim 1, wherein a single probability state is assigned to a group of contexts according to a classification.

11. The method of claim 1, wherein performing inverse binary arithmetic coding comprises applying adaptive probability estimation using the parameter associated with the coded unit to update the respective probability state for the bin.

12. The method of claim 1, wherein determining the respective threshold of the plurality of thresholds for each bin of the plurality of bins comprises:
  determining a first threshold of the plurality of thresholds for a first bin of the plurality of bins; and
  determining a second threshold of the plurality of thresholds for a second bin of the plurality of bins that is different from the first threshold.

13. A device for decoding video data, the device comprising:
  one or more storage media; and
  one or more processors configured to:
    receive a video bitstream including encoded representations of one or more syntax elements of a coded unit;
    determine a respective threshold of a plurality of thresholds for each bin of a plurality of bins for the one or more syntax elements based on one or more of a quantization parameter (QP), a slice type, or a high-level syntax;
    initialize a respective probability state for each bin of the plurality of bins for the one or more syntax elements based on a comparison of a parameter associated with the coded unit and the respective threshold of the plurality of thresholds;
    perform inverse binary arithmetic coding on the encoded representations of the one or more syntax elements to obtain each bin of the plurality of bins using a respective probability state for the bin;
    inverse binarize the plurality of bins to obtain the one or more syntax elements; and
    decode the video data based on the one or more syntax elements.

14. The device of claim 13, wherein the video data is for current picture information and wherein, to initialize, the one or more processors are configured to:
  perform selective probability initialization using previously coded picture information, wherein the plurality of thresholds is initialized from probability states or symbol probabilities of the previously coded picture information obtained at different levels of decoding progress.

15. The device of claim 13, wherein the plurality of thresholds is a pre-defined plurality of thresholds for per-context adaption.

16. The device of claim 15, wherein the pre-defined plurality of thresholds for the per-context adaption has a number of thresholds that is different than a number of thresholds for another pre-defined plurality of thresholds for another per-context adaption.

17. The device of claim 15, wherein the pre-defined plurality of thresholds for the per-context adaption is associated with a group, the group corresponding to one of a context used for mode coding, a luma transform coefficient coding, a chroma transform coefficient coding, or an adaptive per context.

18. The device of claim 13,
  wherein the one or more processors are configured to determine a respective counter for each bin of the plurality of bins based on one or more of the QP, the slice type, or the high-level syntax; and
  wherein the initialization of the respective probability state is based on a comparison of the respective threshold for each bin of the plurality of bins and the respective counter for each bin of the plurality of bins.

19. The device of claim 13, wherein a context is assigned to each bin, wherein the context includes the respective probability state, and wherein the initializing is in response to determining a count of a number of bins processed using the context exceeds a minimum value.

20. The device of claim 13, wherein, to decode the video data, the one or more processors are configured to decode one or more of a B-slice or P-slice and wherein the coded unit comprises a slice, picture, or a largest coding unit (LCU).

21. The device of claim 13, wherein the plurality of thresholds is counter-based.

22. The device of claim 13, wherein a single probability state is assigned to a group of contexts according to a classification.

23. The device of claim 13, wherein, to perform inverse binary arithmetic coding, the one or more processors are configured to apply adaptive probability estimation using the parameter associated with the coded unit to update the respective probability state for the bin.

24. The device of claim 13, wherein the device comprises a wireless communication device, further comprising a receiver configured to receive encoded video data.

25. The device of claim 24, wherein the wireless communication device comprises a telephone handset and wherein the receiver is configured to demodulate, according to a wireless communication standard, a signal comprising the encoded video data.

26. The device of claim 13, wherein, to determine the respective threshold of the plurality of thresholds for each bin of the plurality of bins, the one or more processors are configured to:
  determine a first threshold of the plurality of thresholds for a first bin of the plurality of bins; and
  determine a second threshold of the plurality of thresholds for a second bin of the plurality of bins that is different from the first threshold.

27. A computer-readable storage medium storing instructions that, when executed, cause one or more processors to:
  receive a video bitstream including encoded representations of one or more syntax elements of a coded unit;
  determine a respective threshold of a plurality of thresholds for each bin of a plurality of bins for the one or more syntax elements based on one or more of a quantization parameter (QP), a slice type, or a high-level syntax;
  initialize a respective probability state for each bin of the plurality of bins for the one or more syntax elements based on a comparison of a parameter associated with the coded unit and the respective threshold of the plurality of thresholds;
  perform inverse binary arithmetic coding on the encoded representations of the one or more syntax elements to obtain each bin of the plurality of bins using a respective probability state for the bin;
  inverse binarize the plurality of bins to obtain the one or more syntax elements; and
  decode the video data based on the one or more syntax elements.

28. An apparatus comprising:
  means receiving a video bitstream including encoded representations of one or more syntax elements of a coded unit;
  means for determining a respective threshold of a plurality of thresholds for each bin of a plurality of bins for the one or more syntax elements based on one or more of a quantization parameter (QP), a slice type, or a high-level syntax;

means for initializing a respective probability state for each bin of the plurality of bins for the one or more syntax elements based on a comparison of a parameter associated with the coded unit and the respective threshold of the plurality of thresholds;

means for performing inverse binary arithmetic coding on the encoded representations of the one or more syntax elements to obtain each bin of the plurality of bins using a respective probability state for the bin;

means for inverse binarizing the plurality of bins to obtain the one or more syntax elements; and means for decoding the video data based on the one or more syntax elements.

29. A method of encoding video data, the method comprising:

encoding, by processing circuitry, the video data to generate one or more syntax elements of a coded unit;

binarizing, by the processing circuitry, the one or more syntax elements to obtain a plurality of bins for the one or more syntax elements;

determining, by the processing circuitry, a respective threshold of a plurality of thresholds for each bin of the plurality of bins for the one or more syntax elements based on one or more of a quantization parameter (QP), a slice type, or a high-level syntax;

initializing, by the processing circuitry, a respective probability state for each bin of the plurality of bins for the one or more syntax elements based on a comparison of a parameter associated with the coded unit and the respective threshold of the plurality of thresholds;

performing, by the processing circuitry, binary arithmetic coding on the plurality of bins of the one or more syntax elements to obtain encoded representations of the one or more syntax elements using a respective probability state for the bin; and outputting, by the processing circuitry, a video bitstream including the encoded representations of the one or more syntax elements.

30. The method of claim 29, wherein the video data is for current picture information and wherein the initializing comprises:

performing selective probability initialization using previously coded picture information, wherein the plurality of thresholds is initialized from probability states or symbol probabilities of the previously coded picture information obtained at different levels of encoding progress.

31. The method of claim 29, wherein the plurality of thresholds is a pre-defined plurality of thresholds for per-context adaption.

32. The method of claim 31, wherein the pre-defined plurality of thresholds for the per-context adaption has a number of thresholds that is different than a number of thresholds for another pre-defined plurality of thresholds for another per-context adaption.

33. The method of claim 31, wherein the pre-defined plurality of thresholds for the per-context adaption is associated with a group, the group corresponding to one of a context used for mode coding, a luma transform coefficient coding, a chroma transform coefficient coding, or an adaptive per context.

34. The method of claim 29, further comprising:

determining, by the processing circuitry, a respective counter for each bin of the plurality of bins based on one or more of the QP, the slice type, or the high-level syntax, wherein the initializing is based on a comparison of the respective threshold for each bin of the plurality of bins and the respective counter for each bin of the plurality of bins.

35. The method of claim 29, wherein a context is assigned to each bin, wherein the context includes the respective probability state, and wherein the initializing is in response to determining, by the processing circuitry, a count of a number of bins processed using the context exceeds a minimum value.

36. The method of claim 29, wherein encoding the video data comprises encoding one or more of a B-slice or P-slice and wherein the coded unit comprises a slice, picture, or a largest coding unit (LCU).

37. The method of claim 29, wherein the plurality of thresholds is counter-based.

38. The method of claim 29, wherein a single probability state is assigned to a group of contexts according to a classification.

39. The method of claim 29, wherein performing the binary arithmetic coding comprises applying adaptive probability estimation using the parameter associated with the coded unit to update the respective probability state for the bin.

40. A device for encoding video data, the device comprising:

one or more storage media configured to store video data; and one or more processors configured to:
  encode the video data to generate one or more syntax elements of a coded unit;
  binarize the one or more syntax elements to obtain a plurality of bins for the one or more syntax elements;
  determine a respective threshold of a plurality of thresholds for each bin of the plurality of bins for the one or more syntax elements based on one or more of a quantization parameter (QP), a slice type, or a high-level syntax;
  initialize a respective probability state for each bin of the plurality of bins for the one or more syntax elements based on a comparison of a parameter associated with the coded unit and the respective threshold of the plurality of thresholds;
  perform binary arithmetic coding on the plurality of bins of the one or more syntax elements to obtain encoded representations of the one or more syntax elements using a respective probability state for the bin; and
  output a video bitstream including the encoded representations of the one or more syntax elements.

* * * * *